United States Patent [19]

Otsuchi et al.

[11] Patent Number: 6,050,144
[45] Date of Patent: Apr. 18, 2000

[54] ACCELERATION SENSOR

[75] Inventors: Tetsuro Otsuchi; Katsu Takeda, both of Osaka; Katsunori Moritoki, Takatsuki; Osamu Kawasaki, Kyotanabe; Junichi Kato, Osaka; Kouji Kawakita, Jouyou; Hiroshi Kagata, Hirakata, all of Japan

[73] Assignee: Matsushita Electric Industrial Co., Ltd., Osaka, Japan

[21] Appl. No.: 09/089,660

[22] Filed: Jun. 3, 1998

[30] Foreign Application Priority Data

Jun. 4, 1997 [JP] Japan .................................. 9-146706

[51] Int. Cl.⁷ .............................. G01P 15/09; G01P 21/00
[52] U.S. Cl. ............................ 73/514.34; 73/1.38
[58] Field of Search ........................... 73/514.34, 1.38, 73/654; 310/329, 331, 332

[56] References Cited

U.S. PATENT DOCUMENTS

| | | | |
|---|---|---|---|
| 3,285,074 | 11/1966 | Elazar | 73/514.34 |
| 4,649,313 | 3/1987 | Ogawa et al. | 310/332 |
| 4,950,914 | 8/1990 | Kurihara et al. | 310/329 |
| 5,452,612 | 9/1995 | Smith et al. | 73/514.34 |
| 5,473,930 | 12/1995 | Gademann et al. | 73/1.38 |
| 5,515,725 | 5/1996 | Tabota et al. | 73/514.34 |
| 5,631,421 | 5/1997 | Ohgke et al. | 73/514.34 |
| 5,734,107 | 3/1998 | Boehm et al. | 73/514.34 |

FOREIGN PATENT DOCUMENTS

| | | |
|---|---|---|
| 3817354 | 12/1988 | Germany . |
| 4439297 | 5/1996 | Germany . |
| 19735155 | 2/1998 | Germany . |
| 63-241467 | 10/1988 | Japan . |
| 63-289460 | 11/1988 | Japan . |
| 01102372 | 4/1989 | Japan . |
| 02093370 | 4/1990 | Japan . |
| 03010163 | 1/1991 | Japan . |
| 06066827 | 3/1994 | Japan . |
| 08101060 | 4/1996 | Japan . |
| 09159690 | 6/1997 | Japan . |

*Primary Examiner*—John E. Chapman
*Attorney, Agent, or Firm*—Smith, Gambrell & Russell, LLP

[57] ABSTRACT

An acceleration sensor has a piezoelectric element which includes a piezoelectric member layer in which a plurality of piezoelectric members are stacked and electrodes which are disposed in major opposed surfaces of the piezoelectric member layer; and a support member for supporting the piezoelectric element, wherein some piezoelectric members of the piezoelectric member layer are polarized, the electrodes are disposed in the both surfaces of the polarized piezoelectric members, capacitors which are formed by the polarized piezoelectric members and the electrodes in the both surfaces of the polarized piezoelectric members are connected parallel to each other.

5 Claims, 36 Drawing Sheets

ACCELERATION SENSOR

BACKGROUND OF THE INVENTION

1. Field of the Invention

The present invention relates to an acceleration sensor for use in measurement of an acceleration, detection of vibration, etc.

2. Related art of the Invention

Recent years have seen further size reduction of electronic devices and a more popular use of portable electronic devices such as a notebook computer. To ensure and improve the reliability of such an electronic device against an impact, a small high-performance acceleration (shock) sensor which enables surface mounting is increasingly desired. For example, when an impact is applied during writing in a high-density hard disk, a head is displaced. As a result, a data write error may be created or the head may be damaged. To deal with this, it is necessary to detect the impact which is applied to the hard disk and stop the write operation or retract the head to a safe position.

Meanwhile, there is also an increasing demand for an acceleration sensor for shock detection which is to be used in an airbag device for protecting a passenger from an impact upon a car crash accident, and for detection of an acceleration for suspension control. These acceleration sensors are desired to be further reduced in size and weight.

By the way, piezoelectric ceramics can be used as an acceleration sensor, since when force which is proportional to an acceleration is applied to a piezoelectric ceramic, the piezoelectric ceramic is internally distorted and an electric charge is created at the both surfaces of the piezoelectric ceramic. FIG. 38 is a drawing which shows a structure of a piezoelectric ceramic element 500 of a conventional piezoelectric type acceleration sensor. The structure is a metallic plate joined to a piezoelectric ceramic 50 which is formed in a plate-like or disk-like shape. Electrodes are disposed on the two surfaces, one upper and the other lower, of the piezoelectric ceramic 50. The electrode disposed on one of the two surfaces is divided into two, and used as a drive electrode 52 and a detection electrode 51 for self diagnosis. As the piezoelectric ceramic element 50 deflects and vibrates in the vertical direction, an electric charge is created at an output electrode.

FIG. 39 shows a typical signal processing circuit of a piezoelectric type acceleration sensor. For an acceleration sensor for measuring an acceleration, a source follower circuit which uses an field effect transistor (FET). The source follower circuit has a large impedance conversion efficiency, and the gain of the circuit is about 0 dB.

In the circuit shown in FIG. 39, an output frequency range on a lower frequency side is determined by an electrostatic capacitance C11 of the acceleration sensor and a cut-off frequency which is defined by a time constant (1/ωs) of a high pass filter which is formed by a resistor Rh which is connected in parallel to the acceleration sensor. The cut-off frequency fhc of the high pass filter is:

$$fhc = 1/\omega s = 1/(2\pi \cdot C11 \cdot Rh)$$

Although the capacitance of a piezoelectric type acceleration sensor is generally dependent on the shape of the acceleration sensor, a piezoelectric sensor which is fabricated using a piezoelectric ceramic has a few hundreds pF. On the other hand, the resistor Rh has about 1 MΩ to 10 MΩ when a general purpose chip resistor which uses the resistor Rh as a gate resistor is used. Hence, in the case of a piezoelectric sensor which uses a piezoelectric ceramic, the cut-off frequency is about a few hundreds Hz.

As described above, the lower limit of a measurable frequency of the piezoelectric type acceleration sensor is determined by a capacitance of the acceleration sensor and a resistance value which is connected thereto, which lowers an output on the lower frequency side.

Next, principles of self diagnosis will be described below. A self diagnosis pulse is applied to the drive electrode for self diagnosis of the piezoelectric element from a transmitter. In response to the self diagnosis pulse, the piezoelectric element vibrates, and the vibration vibrates the acceleration sensor. At this stage, an electric charge which is in accordance with the scale of the vibration is developed at the detection electrode, and converted by the signal processing circuit into a voltage. When the voltage which is obtained as a result of detection of the vibration which is created by the self diagnosis pulse is different from a value which is set in advance, the signal processing circuit diagnoses that the acceleration sensor is in an abnormal condition and executes procedures for dealing with abnormality. In this manner, it is possible to add a function of self-diagnosing a malfunction of the acceleration sensor.

By the way, when an acceleration sensor using a piezoelectric ceramic is to be used in a safety device such as an airbag or to improve the comfortability while driving a rocky road, demanded characteristics are a capability of detecting an acceleration to as low a frequency range as possible, an excellent detection sensitivity in a detectable range, a small pyroelectric effect, and a self diagnosis capability.

To detect an acceleration to as low a frequency range as possible, it is necessary that the cut-off frequency described above is small. Hence, it is necessary to increase the capacitance of the acceleration sensor and the resistance value which is connected to the acceleration sensor.

Against this backdrop, one approach is to increase the resistor Rh which is connected in parallel to the acceleration sensor, thereby reducing the cut-off frequency fhc and accordingly obtaining a constant output to a low frequency. However, a resistor exceeding 10 MΩ is very expensive, and therefore, this approach is not realistic.

Meanwhile, unless a special consideration is taken on a leak current or the like between wires disposed on a substrate to mount, a high resistance can not be substantially obtained. A member, such as a guard ring, for preventing a leak current must be disposed to a connection terminal of the resistor member to the substrate. There is a problem that a change in the environment such as humidity changes a leak current between the wires of the substrate so that an apparent resistance value becomes small.

In addition, although it is easy to form the signal processing circuit which is shown in FIG. 39 as an integrated circuit, like the resistor Rh, a high-resistance resistor of 10 MΩ or more is very difficult to incorporate in an integrated circuit with the current semiconductor technology. While this forces to prepare a high-resistance resistor separately from the acceleration sensor and the signal processing circuit and mount the high-resistance resistor, this increases the number of mounting parts and expands a mounting area size, thereby preventing an effort to reduce the size of a shock detection apparatus or the like.

An alternative approach is to increase the electrostatic capacitance C11 of the acceleration sensor. When the material is same, an electrostatic capacitance or an acceleration sensor becomes larger as the thickness of a piezoelectric element is thinner and the area size is larger. Nevertheless, if the piezoelectric element is formed thin, the mechanical strength of the piezoelectric element is decreased and the piezoelectric element easily breaks, and it becomes hard to treat the piezoelectric element during manufacturing steps. Meanwhile, if the piezoelectric element is formed to have a large area size, it becomes difficult to realize a compact size. Further, since the shape of the piezoelectric element determines a resonance frequency which is closely related with a measurement frequency band, it is not easy to change the shape of the piezoelectric element, which is a problem. Hence, the capacitance should be increased by a different approach.

On the other hand, even if detection within a predetermined frequency range is possible, a sensitivity of the detection must be high. By the way, when the sane piezoelectric ceramic is used, a quantity of electric charges which are generated by vibration is constant. Since Q (electric charges)=C (capacitance) V (sensitivity), the sensitivity is higher as the capacitance is smaller.

That is, to allow the acceleration sensor to detect in as low a frequency range as possible and have a high sensitivity, it is necessary that the capacitance is large and the size is large as well.

Further, with respect to the sensitivity, if electric charges generated during vibration are small, few, it is necessary to use amplifiers in two stages to amplify a signal, which makes the circuit complex. At the same time, since a noise is similarly amplified, the SN ratio deteriorates. Therefore, to prevent a malfunction, the circuit becomes even more complex.

Still further, in the case that the transmitter supplies an oscillation pulse to the drive electrode for the purpose of self diagnosis, the oscillation pulse is driven at a low frequency and vibration is detected by the detection electrode, since the capacitance of the piezoelectric element at the vibration detection electrode portion is small as described earlier, the output voltage from the vibration detection electrode is small. Since the vibration detection electrode is not disposed all over the piezoelectric element, the output voltage is smaller even than the capacitance of the piezoelectric element as a whole. In addition, a quantity of electric charges which are generated at the vibration detection electrode is small depending on the surface area size.

As the output voltage at a low frequency for detection of the vibration during self diagnosis becomes small, the accuracy of self diagnosis at a low frequency deteriorates. This leads to a problem that it is not possible to accurately perform self diagnosis in all frequency band ranges.

Further, vibration fails to be detected if the surface area of the self diagnosis electrode is too small, whereas vibration intensifies and the piezoelectric element is destroyed if the surface area of the self diagnosis electrode is too large. However, when the surface area of the self diagnosis electrode is reduced and the gap from the detection electrode accordingly becomes large, a portion without an electrode expands in the element. If there are a portion with an electrode and a portion without an electrode in the surface of the piezoelectric element layer, due to a difference in the coefficient of contraction, the piezoelectric element bends or rolls, which makes it impossible to obtain a stable element without bending.

SUMMARY OF THE INVENTION

The present invention has been made to deal with the various types of problems with the conventional techniques described above. Accordingly, an object of the present invention is to provide a small acceleration sensor which eliminates the necessity of mounting a high-resistance resistor to a substrate, has a high sensitivity which avoids a decrease in an output voltage even to a low frequency range against a constant acceleration, realizes a flat frequency characteristic of the output voltage, performs accurate self diagnosis in a wide frequency range, and enables a signal to be retrieved.

An acceleration sensor of the present invention comprises:

a piezoelectric element which includes a piezoelectric member layer in which a plurality of piezoelectric members are stacked and electrodes which are disposed in major opposed surfaces of the piezoelectric member layer; and a support member for supporting the piezoelectric element, wherein some piezoelectric members of said piezoelectric member layer are polarized, said electrodes are disposed in the both surfaces of the polarized piezoelectric members, impedances which are formed by said polarized piezoelectric members and said electrodes in both surfaces of said polarized piezoelectric members are connected electrically parallel to each other.

That is the acceleration sensor according to the present invention utilizes a phenomena that in the direction of the thickness of a piezoelectric element, a large number of electric charges are generated in the vicinity of a surface of the element and in the longitudinal direction of the element, a large number of electric charges are generated in the vicinity of a central portion of the element at which the element is held. When a stress is applied to the piezoelectric element, the element bends so that the surface of the element deforms largely and so does the central portion of the element at which the element is held. The acceleration sensor according to the present invention effectively utilizes electric charges which are generated by such a piezoelectric effect.

The acceleration sensor has a stacked layer structure and a large electrostatic capacitance. Therefore, the acceleration sensor has a small size without any bending in stacked elements, it is not necessary to externally mount a high-resistance resistor to a substrate, it is not necessary to prepare a special member or the like for mounting a resistor member to the substrate, the acceleration sensor has a high sensitivity even to low frequencies, performs accurate self diagnosis in a wide frequency range, and permits easy retrieval of electric charges from electrodes.

DESCRIPTION OF THE PREFERRED EMBODIMENTS

Now, preferred embodiments of the present invention will be described with reference to FIGS. 1 through 21.

First Preferred Embodiment

Figure 1:
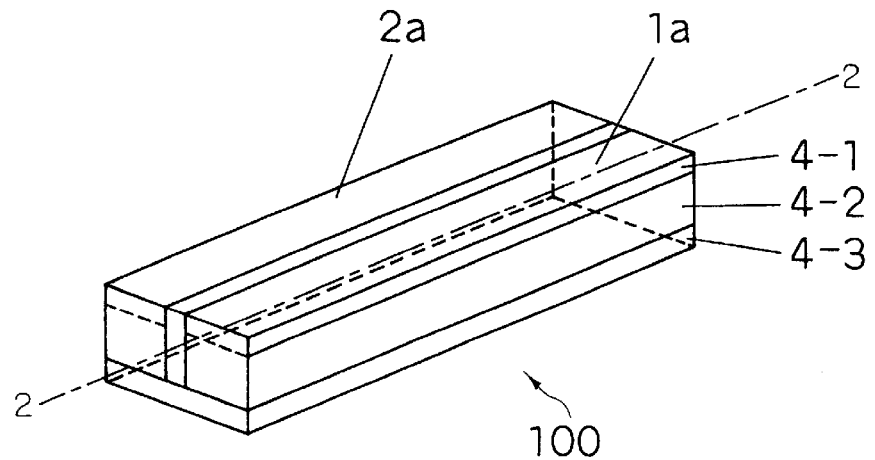
FIG. 1 is a view showing an outer appearance of a piezoelectric element which is used in an acceleration sensor according to a first preferred embodiment of the present invention.

FIG. 1 is a view showing an outer appearance of a piezoelectric element which is used in an acceleration sensor according to a first preferred embodiment of the present invention. The piezoelectric element 100 is formed, in a rectangle shape, as a stack of three layers of a layer 4-1, a layer 4-2 and a layer 4-3. Every layer is formed by a sheet-like shaped ceramic which mainly contains lead zirconate titanate. The layer 4-1 and the layer 4-3 both have a thickness of 50 $\mu$m (more preferably, from about 10$\mu$ to 80 $\mu$), while the layer 4-2 has a thickness of 100$\mu$. Since sheet-like shaped ceramics are stacked and sintered, each layer is formed thinner, and therefore, an electrostatic capacitance of each layer is larger than where piezoelectric ceramic plates are bonded to each other. Two electrodes 1a and 2a are disposed in space from each other in the top surface of the layer 4-1, in such a manner that each electrode is formed in a rectangle shape which extends parallel to each other in the longitudinal direction. In addition, although not shown in FIG. 1, an electrode 3b (which is a portion of a common electrode) is formed in the bottom surface of the layer 4-3. The electrode 1a and an electrode 2b are formed contiguous to each other in a portion at edge surfaces (i.e., the left-hand forward side in FIG. 1). The electrodes are all made of silver, into thicknesses of 1,000 A (angstroms; hereinafter denoted similarly as "A") to 10,000 A.

Figure 2:
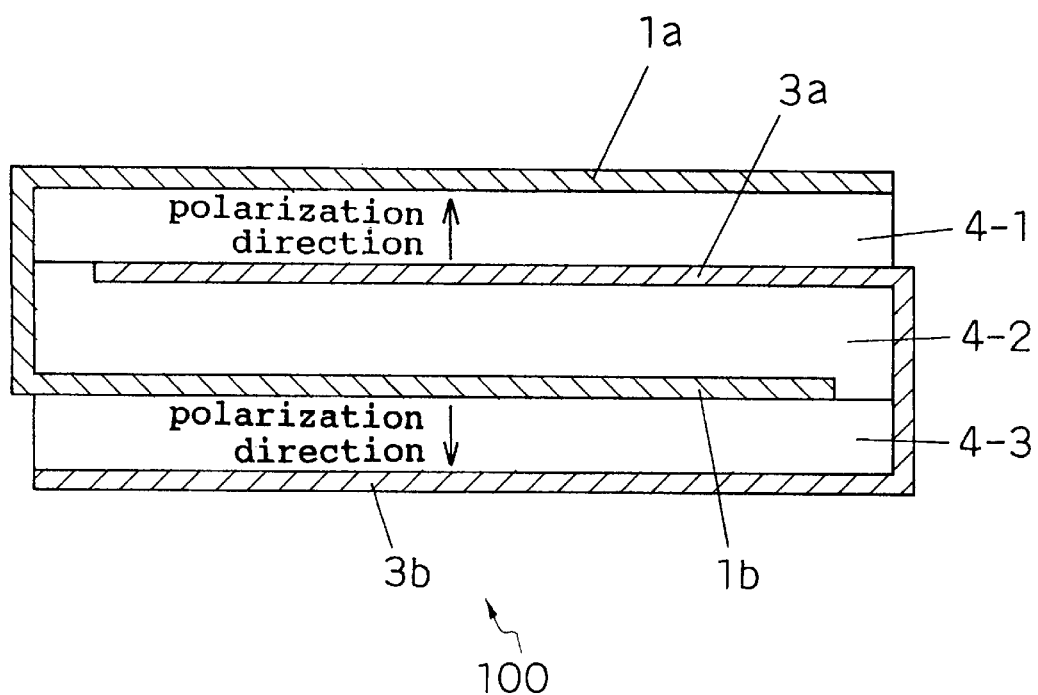
FIG. 2 is a cross sectional view of the piezoelectric element which is used in the acceleration sensor according to the first preferred embodiment of the present invention.
Figure 3:
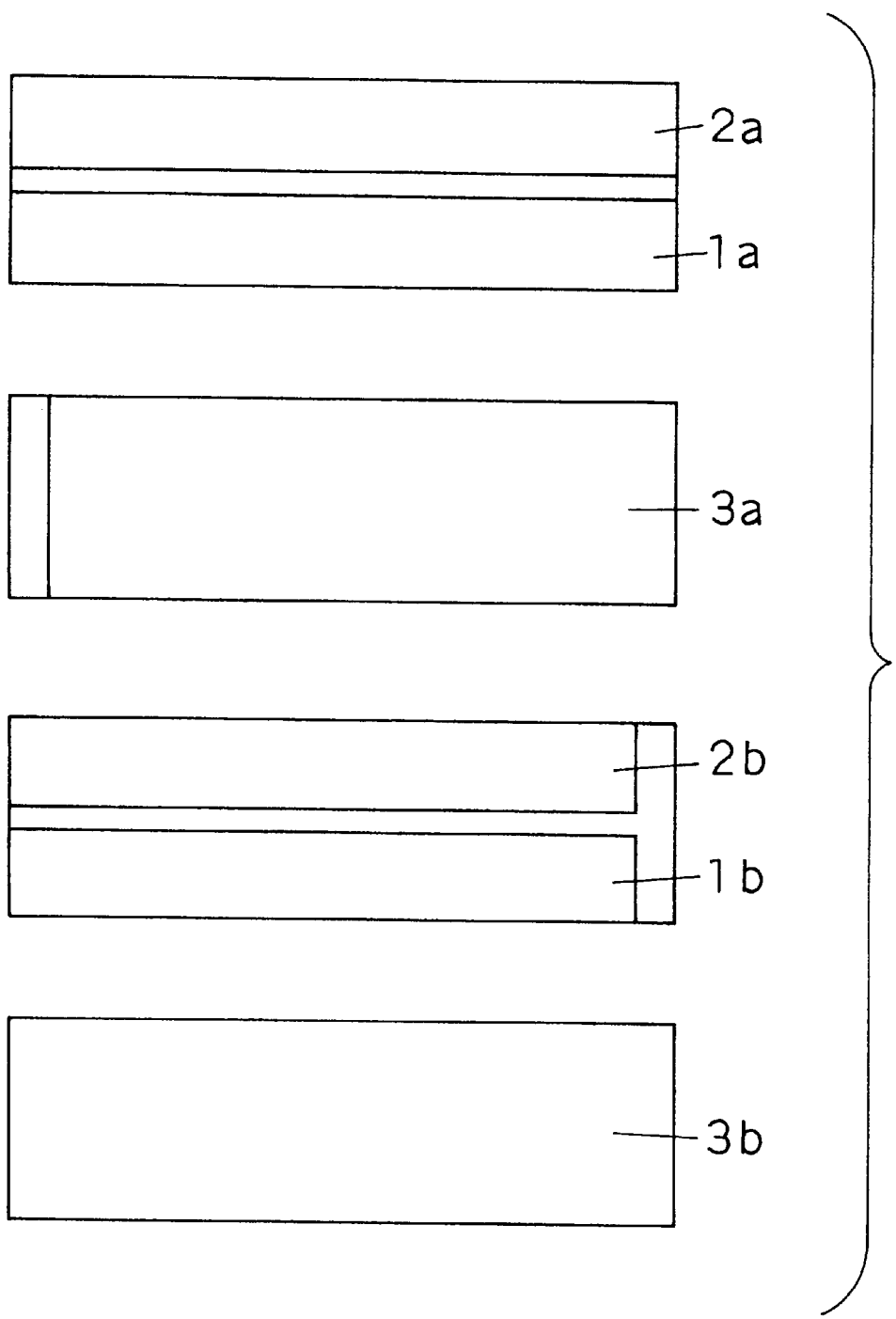
FIG. 3 is a plan view of electrodes of the piezoelectric element which is used in the acceleration sensor according to the first preferred embodiment of the present invention.

FIG. 2 is a cross sectional view of the piezoelectric element 100 taken along X-X' in the electrode 1a portion. FIG. 3 is a plan view showing the electrodes of the respective layers. The electrodes 1b and 2b which are formed between the layers 4-2 and 4-3 have approximately the same shapes as and are divided in a similar manner to the electrodes 1a and 2a which are formed on the surface of the layer 4-1, to be each formed in a rectangle shape which extends parallel to each other in the longitudinal direction. The electrode 1a is connected at an edge surface to the electrode 1b which is formed between the layers 4-2 and 4-3. Although not shown in FIG. 2, like the electrode 1, the electrode 2a as well is connected in a similar manner to the internal electrode 2b. In a similar manner, the electrode 3b at the bottom surface and the electrode 3a (i.e., a portion of the common electrode) which is formed between the layers 4-1 and 4-2 are connected at an opposite edge surface to the electrode 1. For connection, the electrodes 1a, 2a, 1b and 2b are formed extending to one edge (the left-hand side in FIG. 1). The electrodes 1b and 2b are formed retracting somewhat from the edge on the right-hand side in FIG. 1, for the purpose of preventing short-circuit with the connection portion with the electrode 3. In a similar manner, the electrodes 3a and 3b are formed extending to the edge on the right-hand side in FIG. 1 but retracting somewhat from the edge on the left-hand side in FIG. 1.

The layers 4-1 and 4-3 are polarized, with the directions of polarization opposite to each other. The layer 4-2 is not polarized.

As the respective electrodes are connected in this manner, an impedance which is formed by the layer 4-1 and the electrodes 1a and 3a which are on the both surfaces of the layer 4-1 is electrically connected parallel to an impedance which is formed by the layer 4-3 and the electrodes 1b and 3b which are on the both surfaces of the layer 4-3. Hence, an electrostatic capacitance of the piezoelectric element as a whole is a sum of the electrostatic capacitances of the respective layers. Further, since the respective layers are stacked each other, the respective as a whole layers only need to maintain a predetermined strength, and therefore, it is allowed to form each layer as a thin layer and increase the electrostatic capacitance of each other. In addition, since the electrostatic capacitances of the respective layers are added to each other to realize the entire electrostatic capacitance, it is possible to obtain a larger electrostatic capacitance than that of a piezoelectric element which is formed by one layer which has the same thickness.

Figure 4:
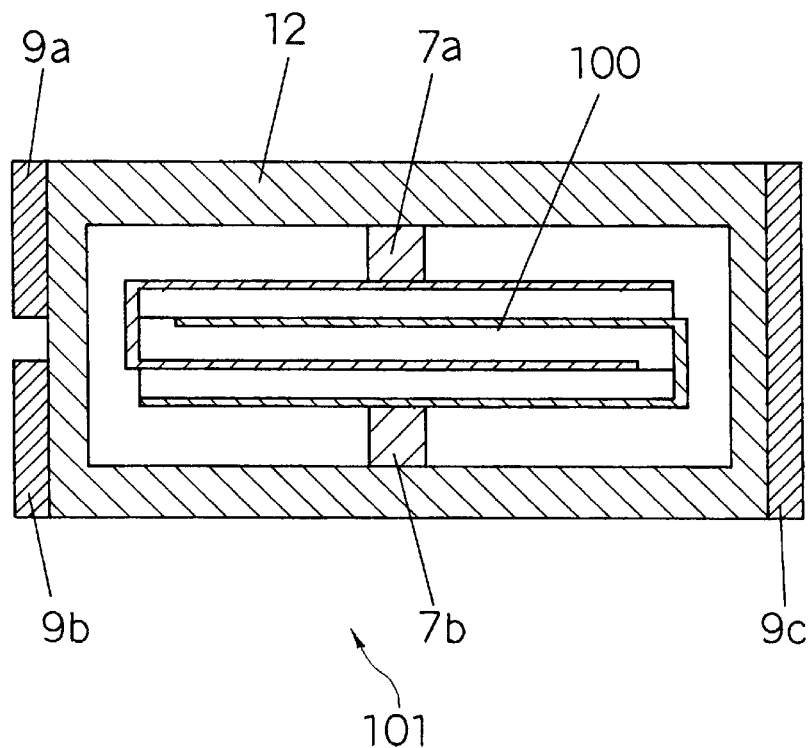
FIG. 4 is a cross sectional view of the acceleration sensor according to the first preferred embodiment of the present invention.

FIG. 4 is a cross sectional view of the acceleration sensor which uses the piezoelectric element which is shown in FIGS. 1 through 3. The piezoelectric element 100, supported at a central portion in the longitudinal direction by support members 7a and 7b, is housed inside a container 12. The container 12 is made of alumina. Outside the container 12, external electrodes 9a, 9b and 9c are disposed. The external electrodes 9a, 9b and 9c are obtained by forming solder layers on Ni. The external electrodes 9a, 9b and 9c are connected to the electrodes 1a, 2a and 3b, respectively, through the support members 7a and 7b, so that it is possible to retrieve electric charges which are generated by an acceleration outside the container 12.

Figure 5:
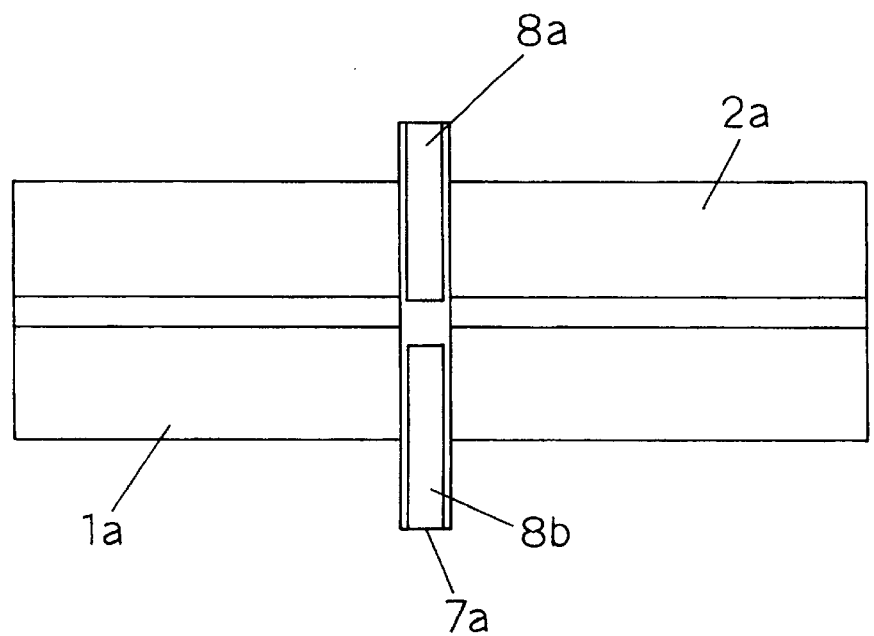
FIG. 5 is a plan view of a support member of the acceleration sensor according to the first preferred embodiment of the present invention.

FIG. 5 is a view showing a condition in which the support member 7a is attached to the piezoelectric element (Only a mounting edge of the support member 7a is shown.). Conductive layers 8a and 8b are disposed to the support member 7a, at a contact surface with the piezoelectric element as shown in FIG. 5. The conductive layers 8a and 8b are connected in contact with the electrodes 1a and 2a which are disposed on the surface of the piezoelectric element 100. Further, the conductive layers 8a and 8b are electrically connected with the external electrodes 9a and 9b, for the purpose of retrieval of electric charges. The conductive layer 8 and the electrodes 1a and 2a may be bonded with each other using a conductive adhesive agent.

As the piezoelectric element having a rectangle shape is used, when an acceleration in the parallel direction to a substrate to which the acceleration sensor is mounted is to be detected, it is necessary to mount the piezoelectric element vertically to the mounting substrate so that the piezoelectric element is approximately perpendicular to the substrate. In other words, the electrode surface of the piezoelectric element 100 must be approximately perpendicular to the mounting substrate. In the case of the piezoelectric element having a rectangle shape, even when the piezoelectric element is mounted upright, the height of the acceleration sensor is not high, and therefore, it is possible to realize a small-size acceleration sensor.

Figure 6:
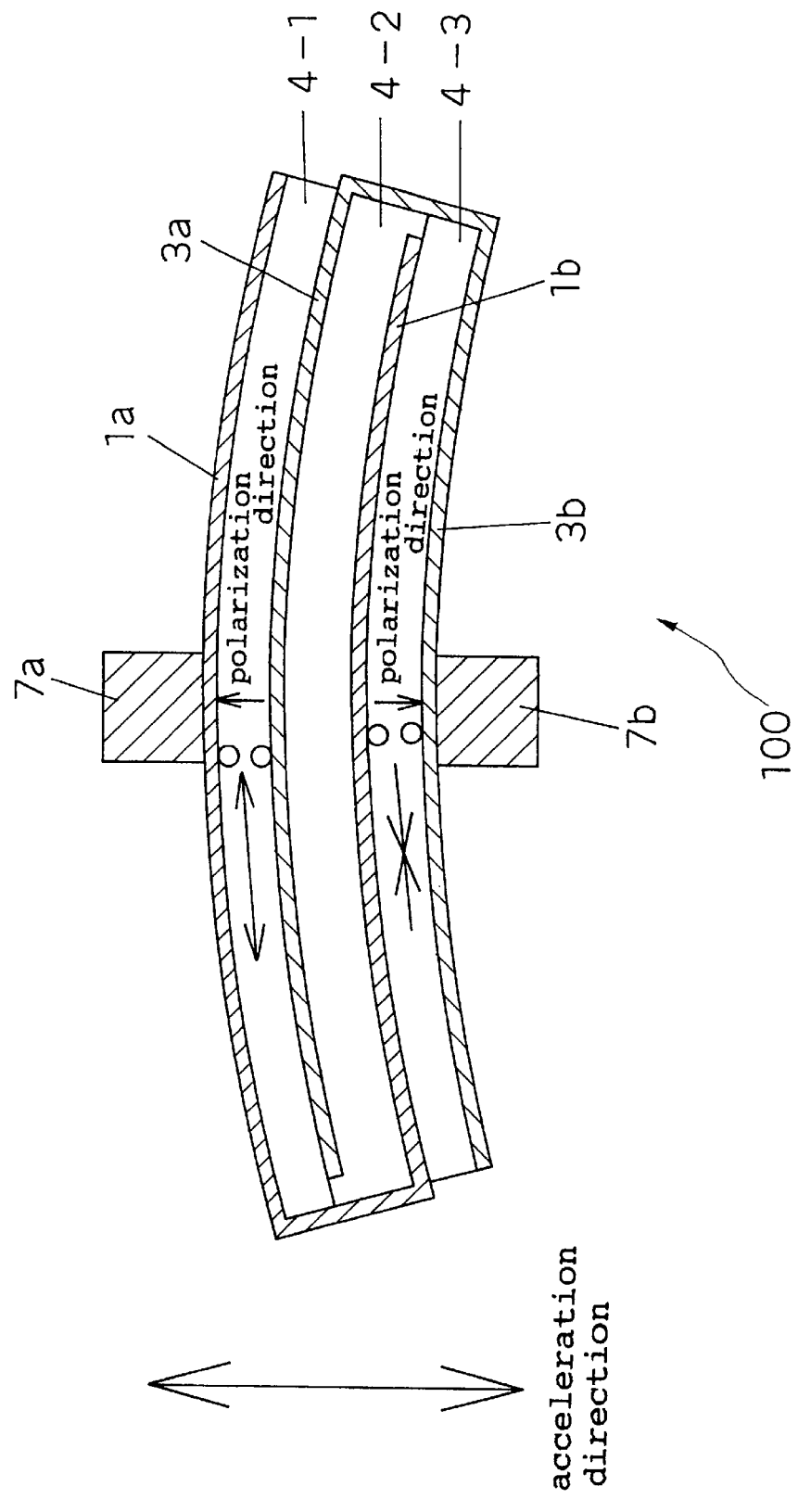
FIG. 6 is a view showing principles of operations of the acceleration sensor according to the first preferred embodiment of the present invention.

FIG. 6 is a view showing principles of operations of the acceleration sensor. When an acceleration is applied in the vertical direction, the piezoelectric element 100 which is supported at the central portion thereof bending and vibrates as shown in FIG. 6. At this stage, one of the two layers at the surfaces among the three layers extends and the other contracts, thereby creating a distortion. In this preferred embodiment, the layer 4-1 extends and the layer 4-3 contracts and the distortion creates electric charges. Since the polarization directions are opposite to each other between the layer 4-1 and the layer 4-3, electric charges of the same polarity are obtained at the electrodes 1a, 1b, the electrodes 2a, 2b, and the electrodes 3a, 3b. The electric charges which are generated at the layer 4-1 and the layer 4-3 are added to each other, so that it is possible to obtain a large quantity of electric charges.

While a large distortion is created between the front surface and the back surface of the piezoelectric element as described above, since the polarized piezoelectric member layers are disposed in this preferred embodiment, it is possible to enhance the sensitivity as well.

Figure 7:
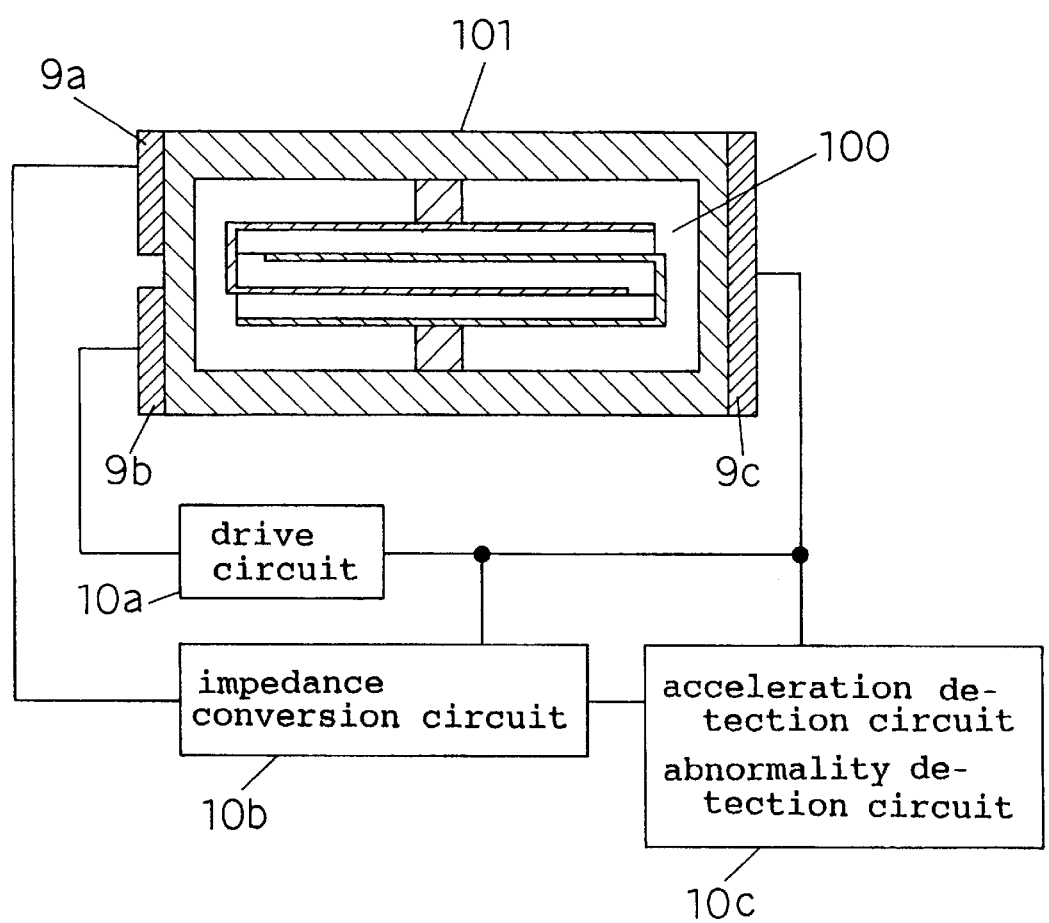
FIG. 7 is a block diagram showing signal processing using the acceleration sensor according to the first preferred embodiment of the present invention.

FIG. 7 is a block diagram of an acceleration detection apparatus which has a self diagnosis function using an acceleration sensor. During self diagnosis, the electrodes 2a and 2b are used as the drive electrode and the electrodes 1a and 1b are used as the vibration detection electrode. The external electrode 9b is connected to a drive circuit 10a for driving vibration for the purpose of self diagnosis. The drive circuit 10a generates an a.c. drive voltage which will be applied to the electrode 2, which is the drive electrode for driving the piezoelectric element, and the electrode 3 through the external electrodes 9b and 9c. The a.c. voltage develop electric fields inside the layer 4-1 and the layer 4-3. Although the electric fields are applied upon in the same direction, since the polarization directions are different from each other, distortions of opposite directions are created and the piezoelectric element as a whole bends and vibrates. The vibration generates electric charges as described above, which are detected by the electrodes 1a and 1b, which serve as the vibration detection electrode, and the electrodes 3a and 3b. The detected electric charges are supplied to the external electrodes 9a and 9c which are connected to an impedance conversion circuit 10b. The impedance conversion circuit 10b is formed by an FET or the like, in general. An output voltage from the impedance conversion circuit 10b is supplied to an acceleration detection circuit and an abnormality detection circuit 10c which determines whether the piezoelectric element is abnormal. In general, the abnormality detection circuit 10c is formed by a high pass filter, a low pass filter, a smoothing circuit, a comparator, etc. An abnormality diagnose is realized by judging whether the abnormality detection circuit 10b outputs a voltage which matches a predetermined value in response to the a.c. voltage which is supplied from the transmitter 10a. When the piezoelectric element is abnormal, the abnormality detection circuit supplies an instruction which demands processing for dealing with abnormality.

Since the drive electrode portion is stacked, each layer is thin and has a large electric fields. This allows a supply of the a.c. voltage having a small amplitude from the oscillation circuit to obtain bending and vibration of a large amplitude, thereby improving the accuracy of self diagnosis.

Further, since the drive electrode is formed to extend along the entire length of the piezoelectric element in the longitudinal direction, it is possible to create a distortion in the piezoelectric element as a whole. As a result, it is possible to efficiently create vibration, and hence, to perform accurate self diagnosis even with a low voltage.

In addition, the detection electrode portion as well is stacked, and therefore, the electrostatic capacitance is large. Hence, it is possible to detect vibration which is induced by the oscillation circuit with a high sensitivity without using a high-resistance resistor for the impedance conversion circuit, which in turn makes it possible to perform accurate self diagnosis in a wide frequency range.

During regular detection of an acceleration as well, since the capacitors which are formed by stacking the thin layers are connected parallel to each other in the piezoelectric element 100, the electrostatic capacitance of the piezoelectric element as a whole is large. Further, it is possible to form each layer thin without damaging the mechanical strength of the piezoelectric element as a whole. Hence, it is possible to obtain a sufficiently high sensitivity to deal with an acceleration with a low frequency, and therefore, to measure without using a high-resistance resistor.

During regular detection of an acceleration, the drive electrodes 2a and 2b and the vibration detection electrodes 1a and 1b may be used as the electrode for detecting an acceleration and connected to the impedance conversion circuit to obtain an even higher sensitivity.

Although the layer 4-2 is not polarized, as this layer is disposed, even though the layer 4-1 and the layer 4-3 are formed extremely thin, it is possible to maintain the strength of the piezoelectric element as a whole. Further, the layer 4-2 has an effect of increasing the electrostatic capacitance.

The method of supporting the piezoelectric element is not limited to supporting at the center of the piezoelectric element, but rather, may be cantilevered at only one end or double-levered at the both ends.

The self diagnosis circuit and the impedance conversion circuit are not limited to as those shown in FIG. 7.

The directions of polarization are not limited to as those shown in the drawings. It is only necessary that the directions of polarization are opposite to each other.

The electrodes 1a and 1b may be used as the drive electrode and the electrodes 2a and 2b may be used as the detection electrode.

While the layers may not have the same thickness, it is preferable that the layer 4-1 and the layer 4-3 have approximately the same thickness. The layer 4-2 may be thicker than the other layers, in which case the layer 4-2 contributes to an improvement of the shock resistance.

Second Preferred Embodiment

Figure 8:
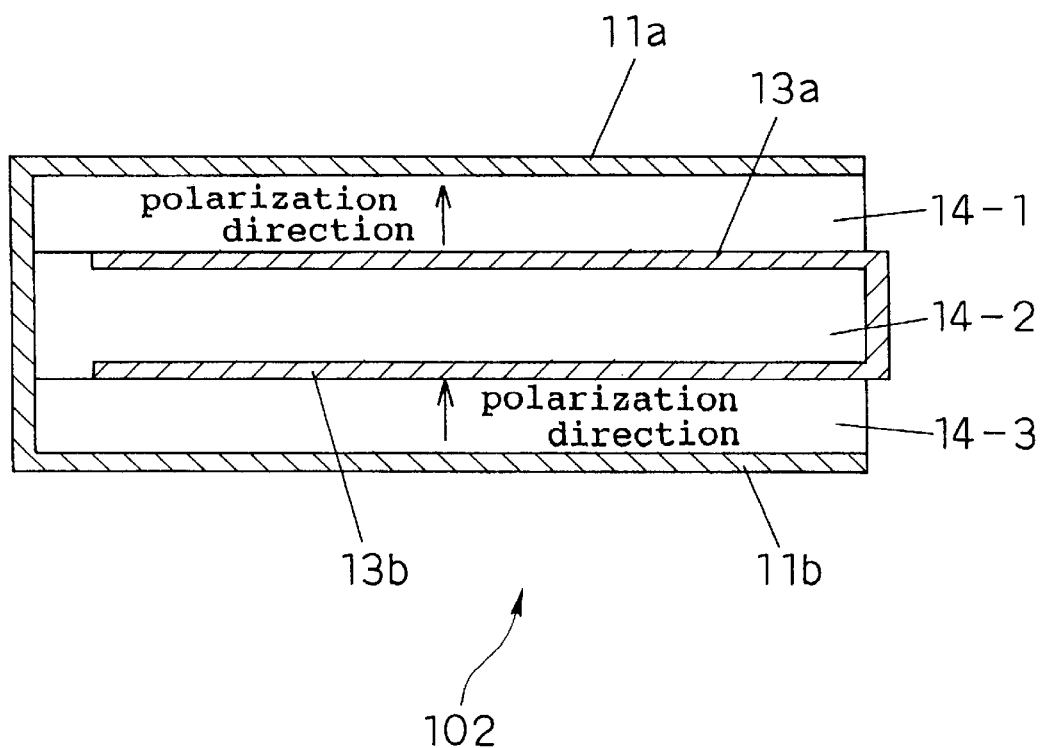
FIG. 8 is a cross sectional view of a piezoelectric element which is used in an acceleration sensor according to a second preferred embodiment of the present invention.
Figure 9:
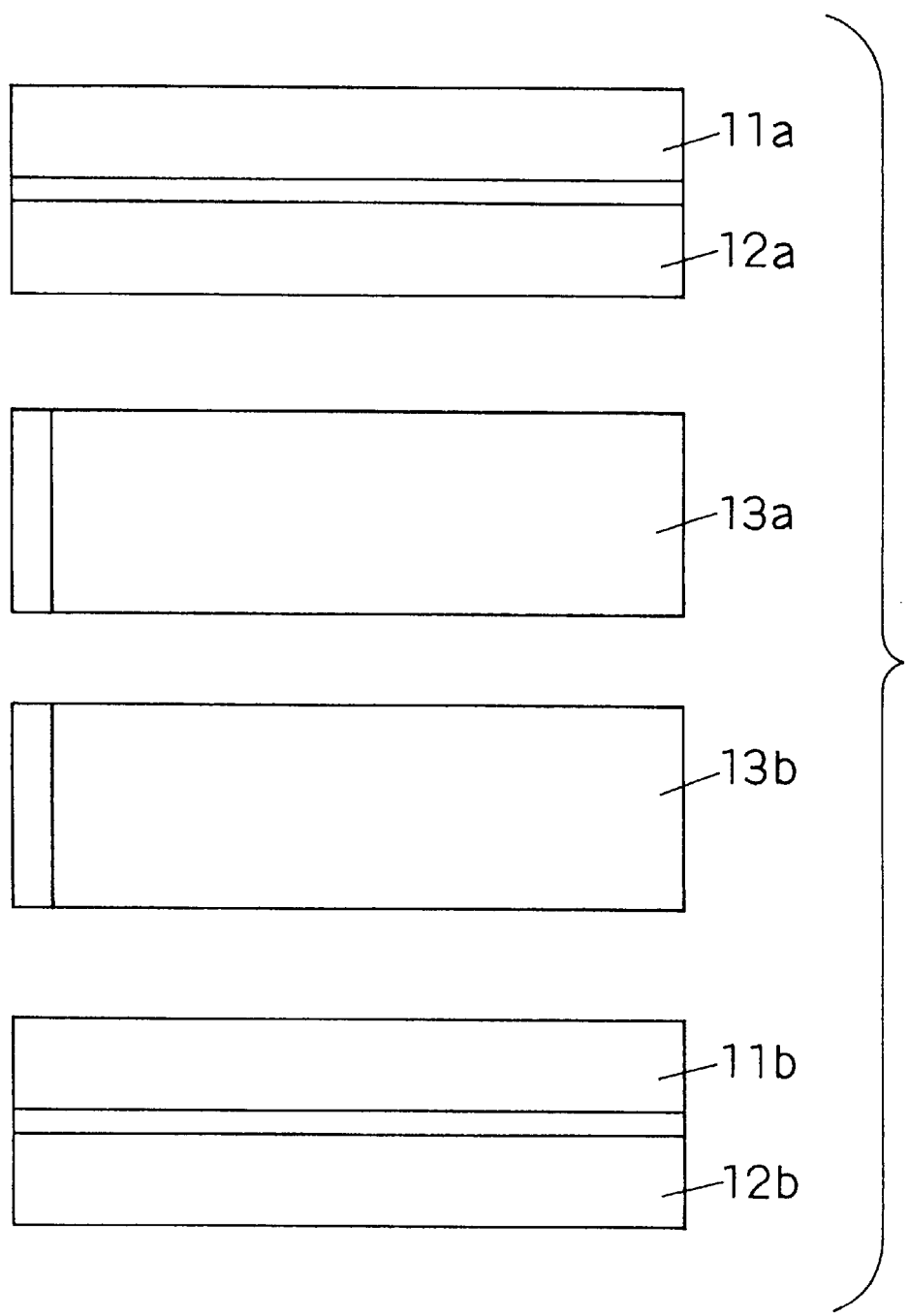
FIG. 9 is a plan view of electrodes of the piezoelectric element which is used in the acceleration sensor according to the second preferred embodiment of the present invention.

FIG. 8 is a cross sectional view of a piezoelectric element of an acceleration sensor according to other preferred embodiment of the present invention. The piezoelectric element 102 is formed, in a rectangle shape, as a stack of three layers 14-1, -2 and -3. The layers 14-1 and 14-3 are polarized, and the polarization directions are the same direction. FIG. 9 is a plan view of electrodes of the piezoelectric element. The electrodes 11a and 11b and the electrodes 12a and 12b are formed parallel to each other in the top surface and the bottom surface of the piezoelectric element, and respectively connected at edge surfaces. The electrodes 13a and 13b are formed inside the piezoelectric element approximately over the entire surface, except at the edge surfaces and portions around the same which serve as connection portions with the electrodes 11 and 12, and connected to each other on the opposite side to the connection portions with the electrodes 11 and 12. A capacitor which is formed by the layer 14-1 and a capacitor which is formed by the layer 14-3 are connected parallel to each other. An electrostatic capacitance is a sum of the electrostatic capacitances of the respective layers, which is large.

The layers 14-1, -2 and -3 are each formed using a ceramic which mainly contains lead zirconate titanate. Silver is used as the electrodes.

Although the polarization directions of the layers 14-1 and 14-3 are the same, since the electrodes are connected in a different direction than that shown in FIG. 2, electric charges of the same polarity are created at the electrode 11a and the electrode 11b as a result of bending and vibration, and therefore, it is possible to detect an acceleration.

The layer 14-2 plays a role of enhancing the strength of the piezoelectric element 102 and increasing the shock resistance.

Meanwhile in the first preferred embodiment an impedance which is formed by the unpolarized layer 4-2 in the middle and electrodes 3a, 1b is electrically connected parallel to the impedance which is formed by the layer 4-1 and electrodes 1a, 3a and to the impedance which is formed by the layer 4-3 and electrodes 1b, 3b and such impedance of the unpolarized layer 4-2 serves as total impedance of whole element. But such unpolarized layer 4-2 does not generate electric charge when it is applied with acceleration and then the electric charge reduces the output and make the sensitivity of the acceleration sensor inferior. However, since the layer 14-2 according to the second preferred embodiment has the opposed surface disposed between the electrodes 13a and 13b, the electrostatic capacitance of this layer fails to be added to the electrostatic capacitances of the layer 14-1 and the layer 14-2 and accordingly increases the sensitivity.

Self diagnosis is performed in a similar manner to that shown in FIG. 7, using the electrode 11 as the vibration detection electrode and the electrode 12 as the drive electrode.

A conductive layer for retrieval of electric charges from the electrodes as well is realized through the support members, in a similar manner to that shown in FIG. 5.

Third Preferred Embodiment

Figure 10:
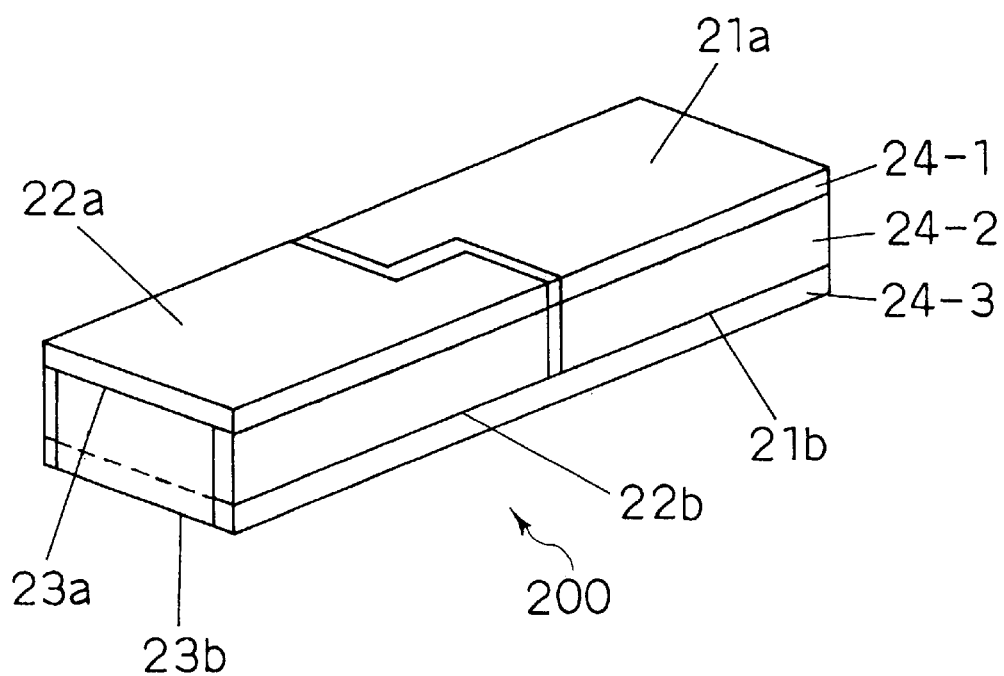
FIG. 10 is a view showing an outer appearance of a piezoelectric element which is used in an acceleration sensor according to a third preferred embodiment of the present invention.
Figure 11:
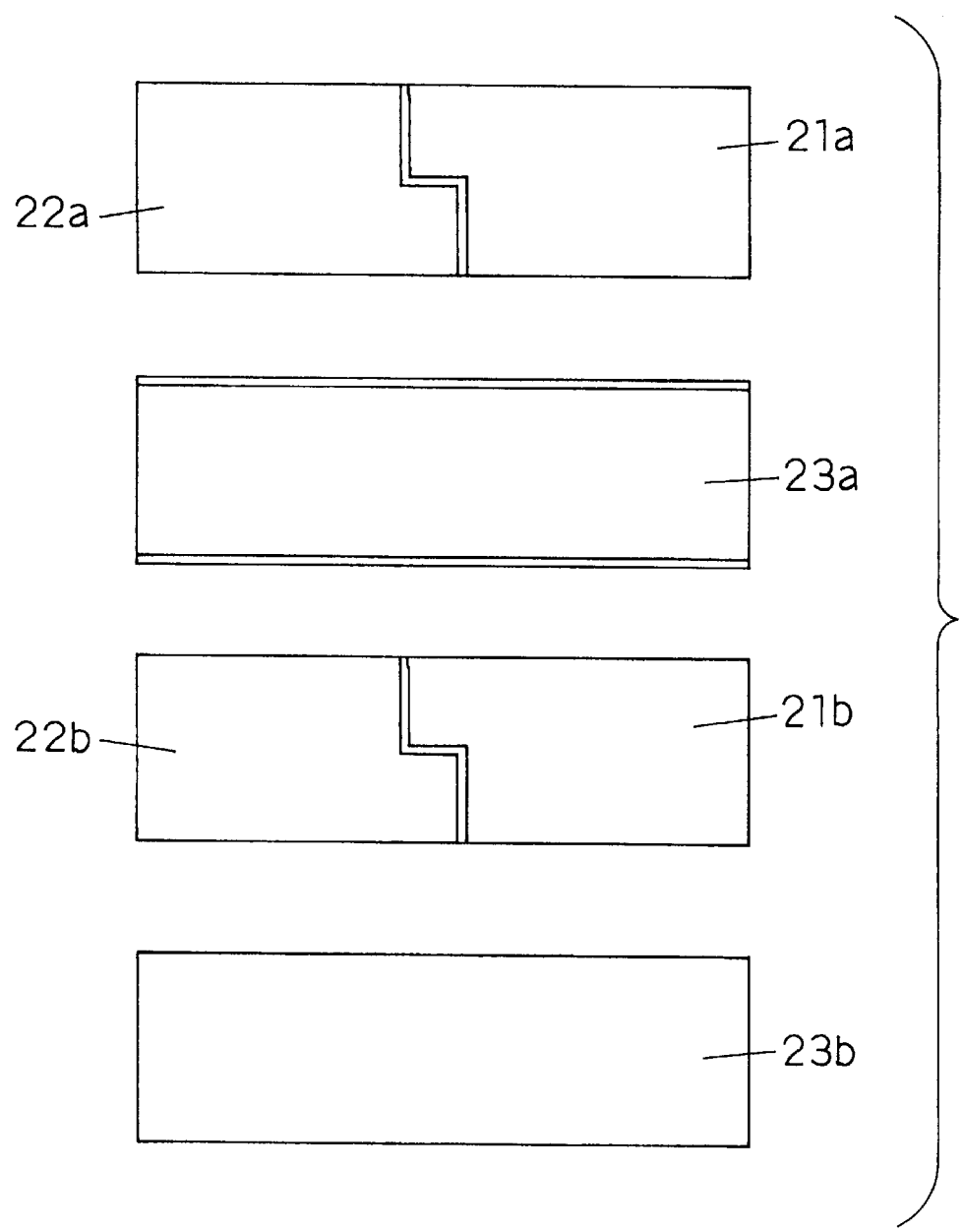
FIG. 11 is a plan view of electrodes of the piezoelectric element which is used in the acceleration sensor according to the third preferred embodiment of the present invention.

FIG. 10 is a view showing an outer appearance of a piezoelectric element of an acceleration sensor according to other preferred embodiment of the present invention, and FIG. 11 is a plan view of electrodes in respective layers of the piezoelectric element.

The piezoelectric element 200 is formed in a rectangle shape and has a stacked structure of three layers 24-1, -2 and -3. The layers 24-1 and 24-3 are polarized in opposite directions to each other.

Electrodes 21a and 22a are disposed in the top surface of the piezoelectric element 200, an electrode 23a is disposed between the layer 24-1 and the layer 24-2, electrodes 21b and 22b are disposed between the layer 24-2 and the layer 24-3, and an electrode 23b is disposed in the bottom surface. The electrodes 21a and 22a are formed respectively on the left-hand side and the right-hand side approximately in a symmetrical configuration with respect to the center of the piezoelectric element in the longitudinal direction. The electrodes 21b and 22b as well are have approximately the same shapes as those of the electrodes 21a and 22a. The electrodes 21a and 21b are connected to each other at an edge surface along the longer sides of the piezoelectric element 200, so are the electrodes 22a and 22b. Electrodes 23a and 23b are disposed approximately over the entire surface of the piezoelectric element 200 except at connection portions with the electrodes 21 and 22, and connected to each other at side surfaces along the shorter sides.

As the electrodes are connected in such a manner, a capacitor which is formed by the layer 24-1 and a capacitor which is formed by the layer 24-3 are connected parallel to each other, thereby increasing the electrostatic capacitance of the piezoelectric element. Further, since the structure is a stacked structure and the layer 24-2 which is not polarized enhances the shock resistance, it is possible to form each layer thin and increase the electrostatic capacitance.

Figure 12:
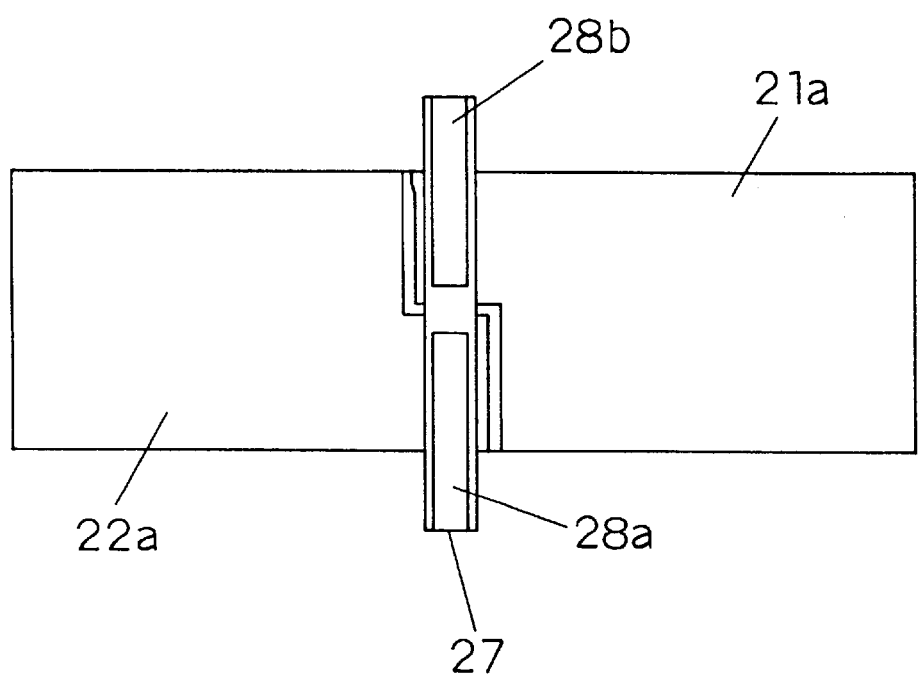
FIG. 12 is a plan view of a support member of the acceleration sensor according to the third preferred embodiment of the present invention.

The electrode 21 has a shape whose upper portion stretches out to the left-hand side from the center and lower portion retracts to the right-hand side as shown in FIG. 11. The electrode 21 is shaped opposite to this. Such stepped shapes are selected to allow one support member to retrieve electric charges from the electrodes in an easy manner. The piezoelectric element 200 is supported at the center thereof in the longitudinal direction, which is similar to FIG. 4. FIG. 12 shows a structure of a conductive layer at a surface which contacts an electrode surface of a support member. The support member 27 includes conductive layers 28a and 28b which respectively contact the electrodes 21a and 22a for electric connection. In a similar manner to that shown in FIG. 4, the conductive layers 28a and 28b are connected to the external electrodes of the container. This makes it possible to retrieve electric charges which are created at the electrodes 21a and 22a outside.

This electrode structure only requires to ensure a space for isolation of the electrodes only at the position of the support portion but allows to form the electrodes over the entire width in the other surface of the piezoelectric element, and therefore, it is possible to efficiently increase the electrostatic capacitance per surface area size.

Operations for detecting an acceleration upon application of the acceleration are similar to those shown in FIG. 6.

Further, self diagnosis is possible with a circuit which is similar to that shown in FIG. 7, using the electrode 21 as the vibration detection electrode and the electrode 22 as the drive electrode. When an a.c. voltage is applied to the electrode 22 by the oscillation circuit, the piezoelectric element 200 as a whole bending and vibrates as it is supported at the center. The vibration is detected by the vibration detection electrode, and malfunction is diagnosed in accordance with an output voltage from the vibration detection electrode. Since the vibration detection portion and the drive portion are both a stacked structure, the both portions have high electrostatic capacitances, which realizes self diagnosis even if the frequency is low.

Materials for forming the layers and the electrodes are similar to those used in the first preferred embodiment.

Self diagnosis may be performed using the electrode 21 as the drive electrode and the electrode 22 as the vibration detection electrode.

Figure 13:
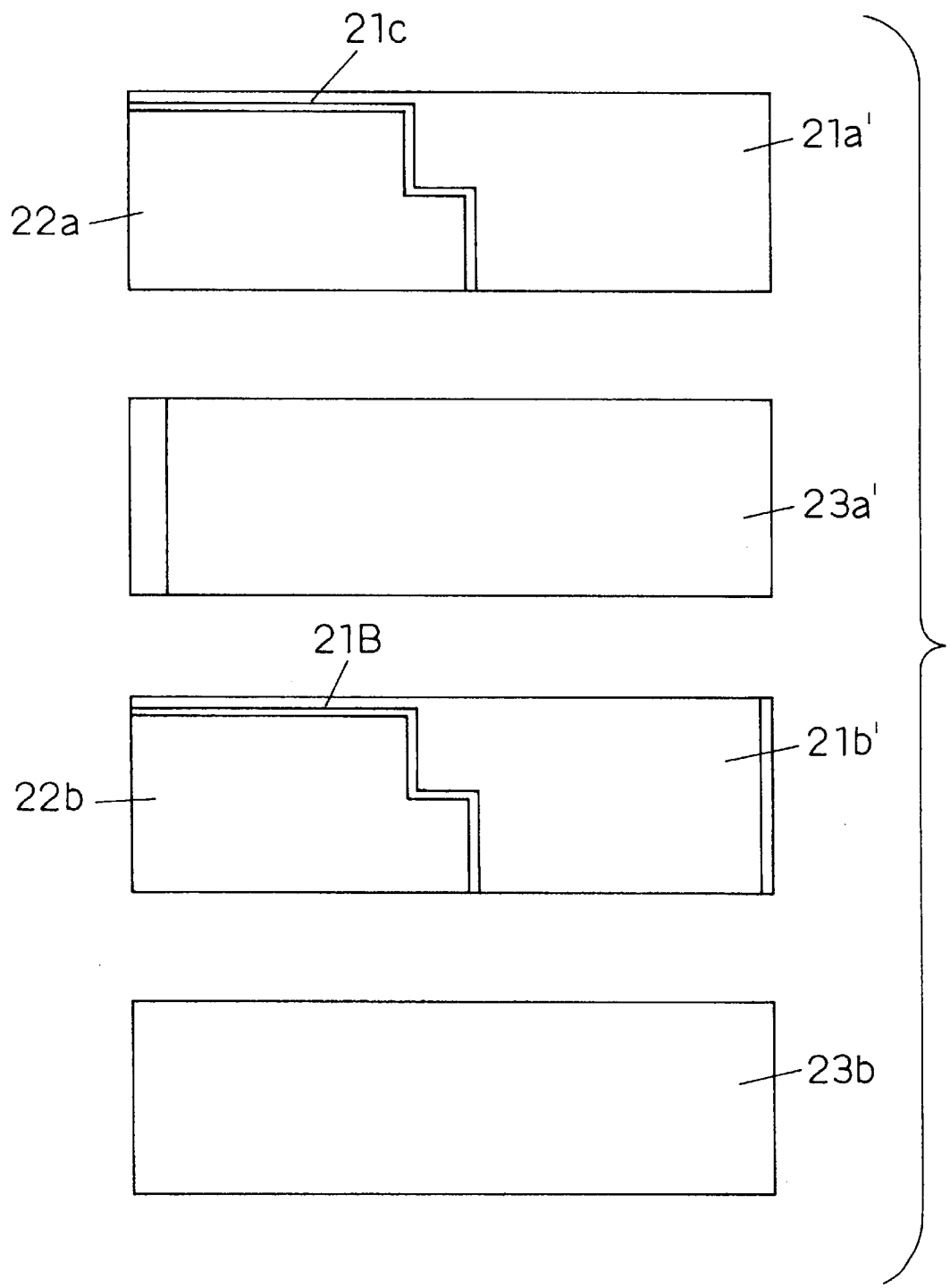
FIG. 13 is a plan view of electrodes of the piezoelectric element which is used in the acceleration sensor according to the third preferred embodiment of the present invention.

Further, instead of connecting the electrodes 21a and 21b at the longer sides of the electrodes, a connection portion 21c for the electrode 21 may be formed along edges of the longer sides as shown in FIG. 13 so that the electrodes 21a and 21b are connected to each other while the electrodes 22a and 22b are connected to each other at edges of the shorter sides.

Fourth Preferred Embodiment

Figure 14:
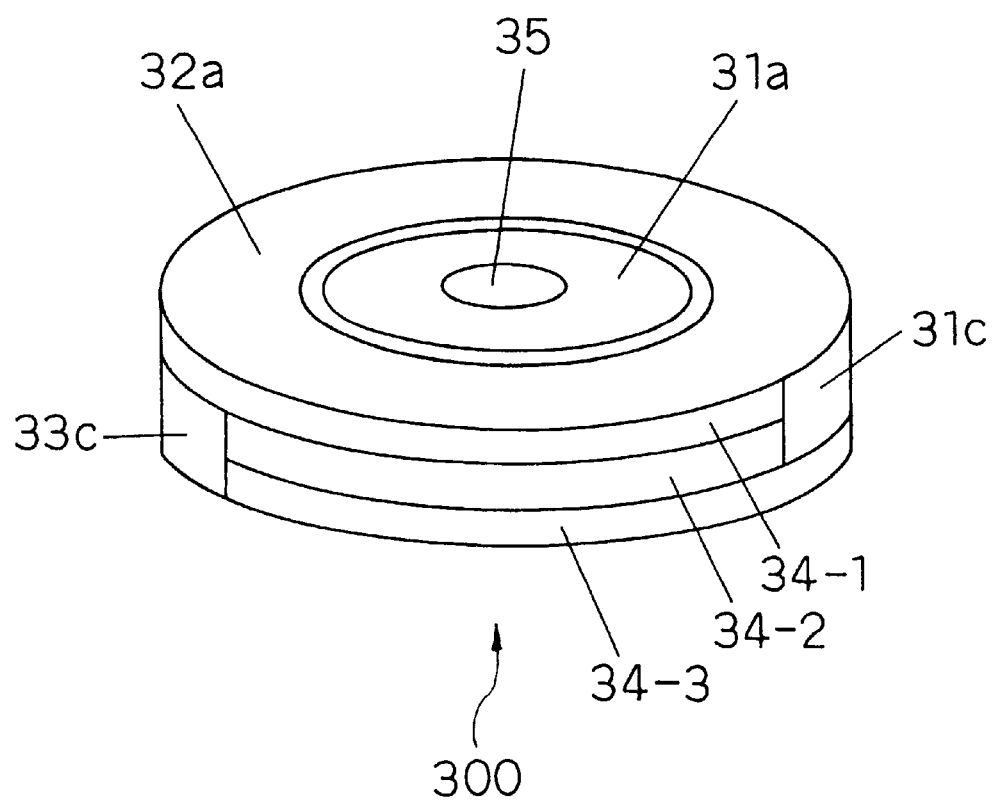
FIG. 14 is a view showing an outer appearance of a piezoelectric element which is used in an acceleration sensor according to a fourth preferred embodiment of the present invention.
Figure 15:
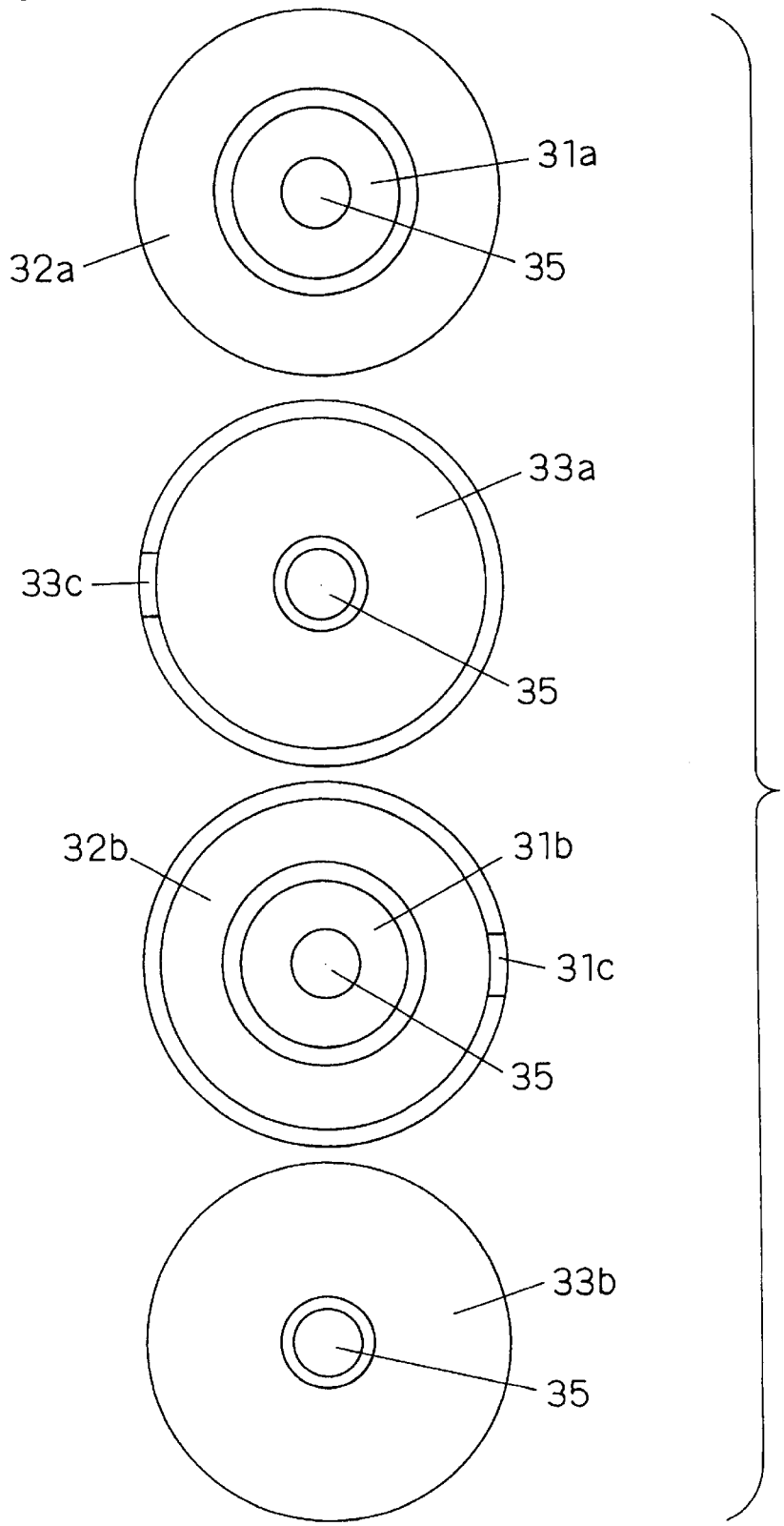
FIG. 15 is a plan view of electrodes of the piezoelectric element which is used in the acceleration sensor according to the fourth preferred embodiment of the present invention.

FIG. 14 is a view showing an outer appearance of a piezoelectric element of an acceleration sensor according to other preferred embodiment of the present invention, and FIG. 15 is a plan view of electrodes in respective layers of the piezoelectric element.

The piezoelectric element 300 is formed as a disk which includes a through hole 35 at the center, and has a stacked structure of three layers 34-1, -2 and -3. The layers 34-1 and 34-2 are polarized in opposite directions to each other.

Electrodes 31a and 32a are disposed in the top surface of the piezoelectric element 300, an electrode 33a is disposed between the layer 34-1 and the layer 34-2, electrodes 31b and 32b are disposed between the layer 34-2 and the layer 34-3, and an electrode 33b is disposed in the bottom surface. The electrodes 31a and 32a are formed concentric with the center of the piezoelectric element. The electrodes 31b and 32b as well have approximately the same shapes as those of the electrodes 31a and 32a. The electrodes 31a and 31b are connected to each other at an edge surface of an inner peripheral portion of the piezoelectric element 300. The electrodes 32a and 32b are connected to each other at an edge surface of an outer peripheral portion of the piezoelectric element 300. Electrodes 33a and 33b are disposed approximately over the entire surface of the piezoelectric element 300 except at connection portions with the electrodes 31 and 32, and connected to each other at side surfaces on the outer peripheral portion. As the electrodes are connected in such a manner, a capacitor which is formed by the layer 34-1 and a capacitor which is formed by the layer 34-3 are connected parallel to each other, thereby increasing the electrostatic capacitance of the piezoelectric element. Further, since the structure is a stacked structure and the layer 34-2 which is not polarized enhances the shock resistance, it is possible to form each layer thin and increase the electrostatic capacitance. Materials for forming the layers and the electrodes are similar to those used in the first preferred embodiment.

Figure 16:
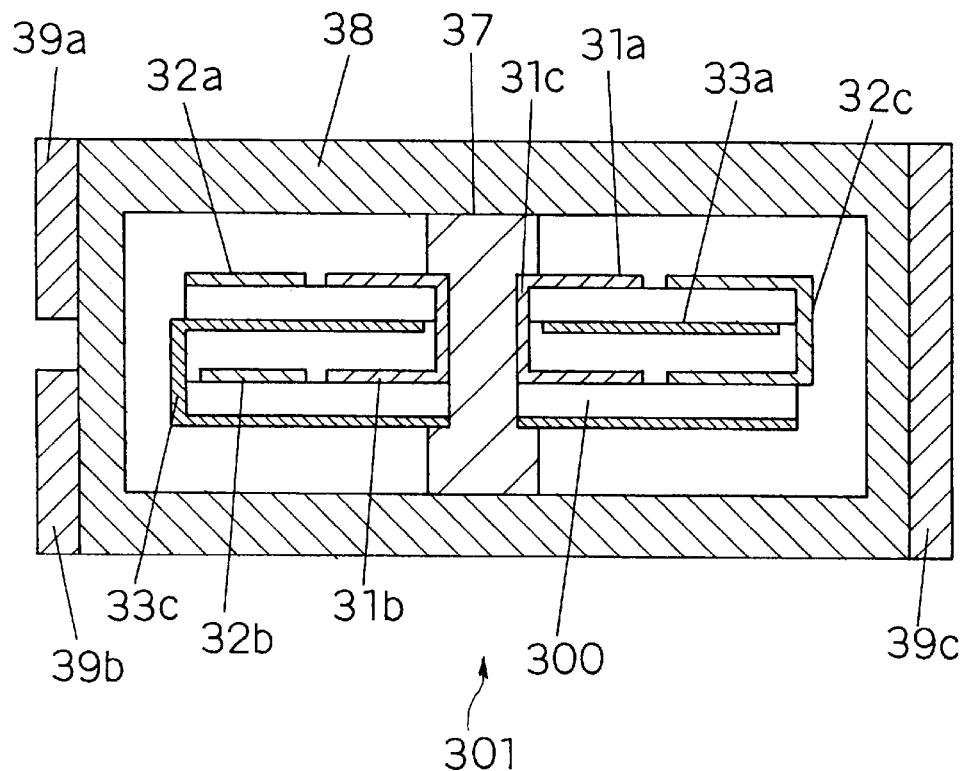
FIG. 16 is a cross sectional view of the piezoelectric element which is used in the acceleration sensor according to the fourth preferred embodiment of the present invention.

FIG. 16 is a cross sectional view of an acceleration sensor which uses the piezoelectric element 300. The piezoelectric element 300 is supported at a central portion thereof by a support member 37 which penetrates through the through hole 35 of the piezoelectric element 300 and suppresses the piezoelectric element 300 at the both surfaces of the piezoelectric element 300. Principles of detection are similar to those shown in FIG. 6. When subjected to an acceleration in the vertical direction of FIG. 16, the piezoelectric element, as it is supported at the center, bending and vibrates at a peripheral portion. A distortion which is created at this stage changes into electric charges, which realizes detection of the acceleration. Since the layers 34-1 and 34-3 are polarized in opposite directions to each other, electric charges of the same polarity are created at the mutually-connected electrodes of the layers.

The electrode 32*a* and the electrode 33*c,* contacting a conductive layer which is disposed in the support member 37 (not shown), are electrically connected to each other. Further, since the conductive layer 8 is connected to external electrodes 39*a* and 39*c,* electric charges are retrieved outside. The electrode 33*b* is connected to the external electrode 39*b* by wiring (not shown).

Figure 17:
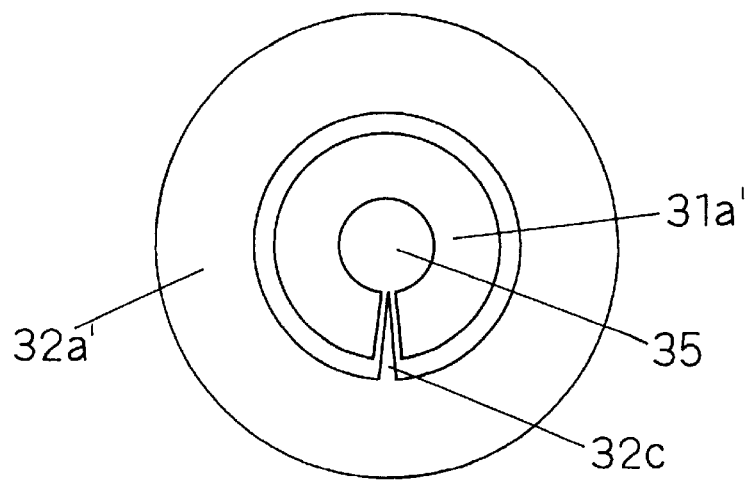
FIG. 17 is a plan view of electrodes of the piezoelectric element which is used in the acceleration sensor according to the fourth preferred embodiment of the present invention.

As a method which does not use such means as wiring to the electrode at the outer peripheral portion, electrodes 31*a* and 31*b* which are formed at the surface of the piezoelectric element may be formed in other shapes. FIG. 17 is a plan view showing other structure of the electrodes which are formed at the surface of the piezoelectric element. A notch is formed partially in the electrode 21*a,* and a connection portion 32*c* for connection of the electrode 32*a'* to the central portion is disposed. The structure of the electrodes is otherwise similar to that shown in FIG. 15. Since connection portion 32*c* is formed extending to the central portion of the piezoelectric element and a conductive layer is formed in the support member 37 and made conductive with connection portion 32*c,* it is possible to ensure electric connection with the external electrode 39*b* without using such means as wiring. Although the electrodes are formed in complex shapes, since such means as wiring is not necessary, the acceleration sensor is fabricated easily and completed in a small size.

Self diagnosis is performed in a similar manner to that shown in FIG. 7. For self diagnosis, using the electrode 32 as the drive electrode, an a.c. voltage is applied between the electrode 32 and the electrode 33 by the oscillation circuit so that the piezoelectric element bends and vibrates. The vibration is converted into a voltage using the electrode 32 as the vibration detection electrode, and malfunction is diagnosed. The stacked structure of the thin layers increases the electrostatic capacitances, which realizes accurate self diagnosis even with a low frequency.

Figure 18:
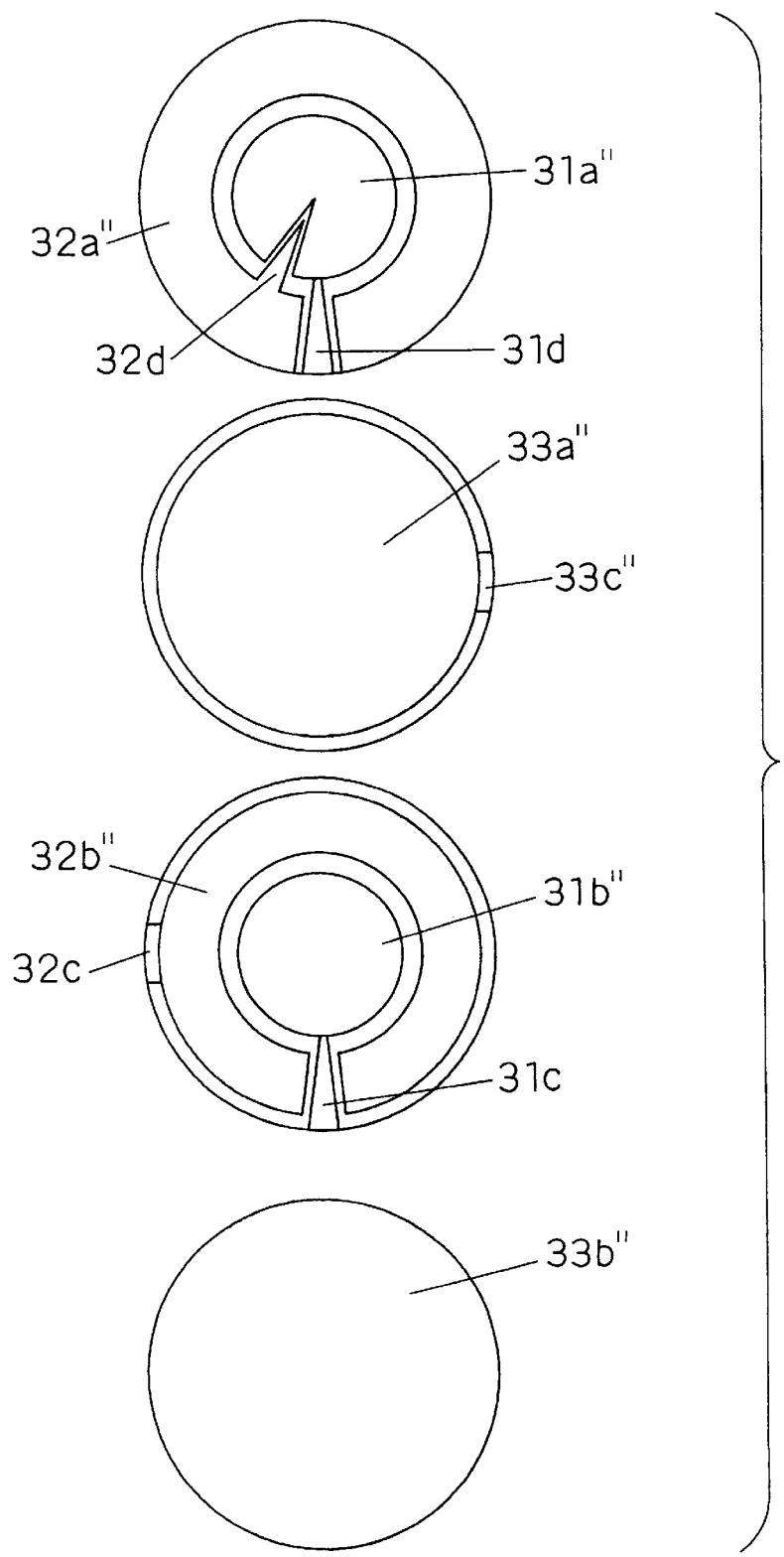
FIG. 18 is a plan view of the electrodes of the piezoelectric element which is used in the acceleration sensor according to the fourth preferred embodiment of the present invention.

Meanwhile, it is also possible to obtain the acceleration sensor without forming the through hole in the piezoelectric element. FIG. 18 is a plan view of the electrodes in a structure that the through hole is not formed in the piezoelectric element. The layer structure and the like of the piezoelectric element except for the electrodes are similar to those shown in FIG. 14. The electrode 31 is formed in a circular shape at the center of the piezoelectric element, while the electrode 32 is formed in a concentric donut-like shape. The electrode 32*a"* is connected to the electrode 32*b"*, which is disposed between the layer 34-2 and the layer 34-3, by the connection portion 32*c* which is disposed at the edges of the longer sides. A connection portion 31*d* which has a narrow width extends from the electrode 31*a"* toward the outer peripheral portion. In a similar manner, a connection portion 31*c* is disposed to the electrode 31*b"* which is disposed between the layer 34-2 and the layer 34-3. The connection portion 31*c* and the connection portion 31*d* are electrically connected at the outer peripheral portion, whereby the electrodes 31*a"* and 31*b"* are conductive with each other. The electrode 33*a"* which is disposed between the layer 34-1 and the layer 34-2 is connected to the electrode 33*b"* which is disposed in the bottom surface of the piezoelectric element, through a connection portion 33*c"* which is disposed at an edge of the outer peripheral portion of the piezoelectric element. Further, in a similar manner to that shown in FIG. 17, a connection portion 32*d* is formed for conduction from the electrode 32 and the support member which is disposed for supporting at the center.

The electrode 32 may be used as the detection electrode and the electrode 31 may he used as the drive electrode.

Fifth Preferred Embodiment

Figure 19:
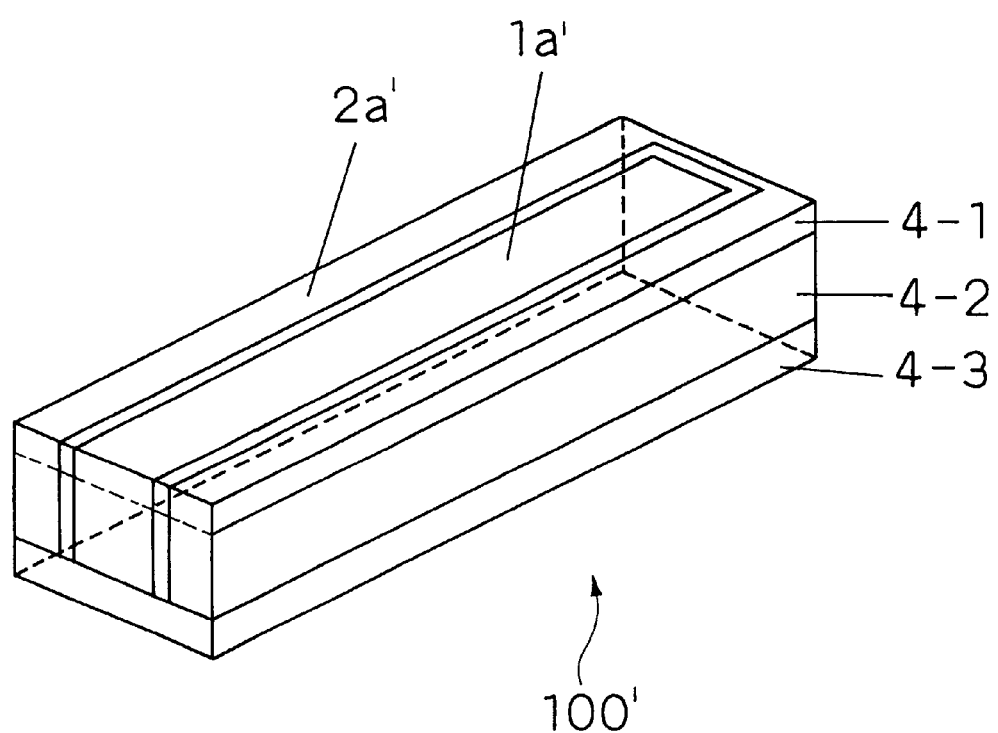
FIG. 19 is a plan view of electrodes of a piezoelectric element which is used in an acceleration sensor according to another preferred embodiment of the present invention.
Figure 20:
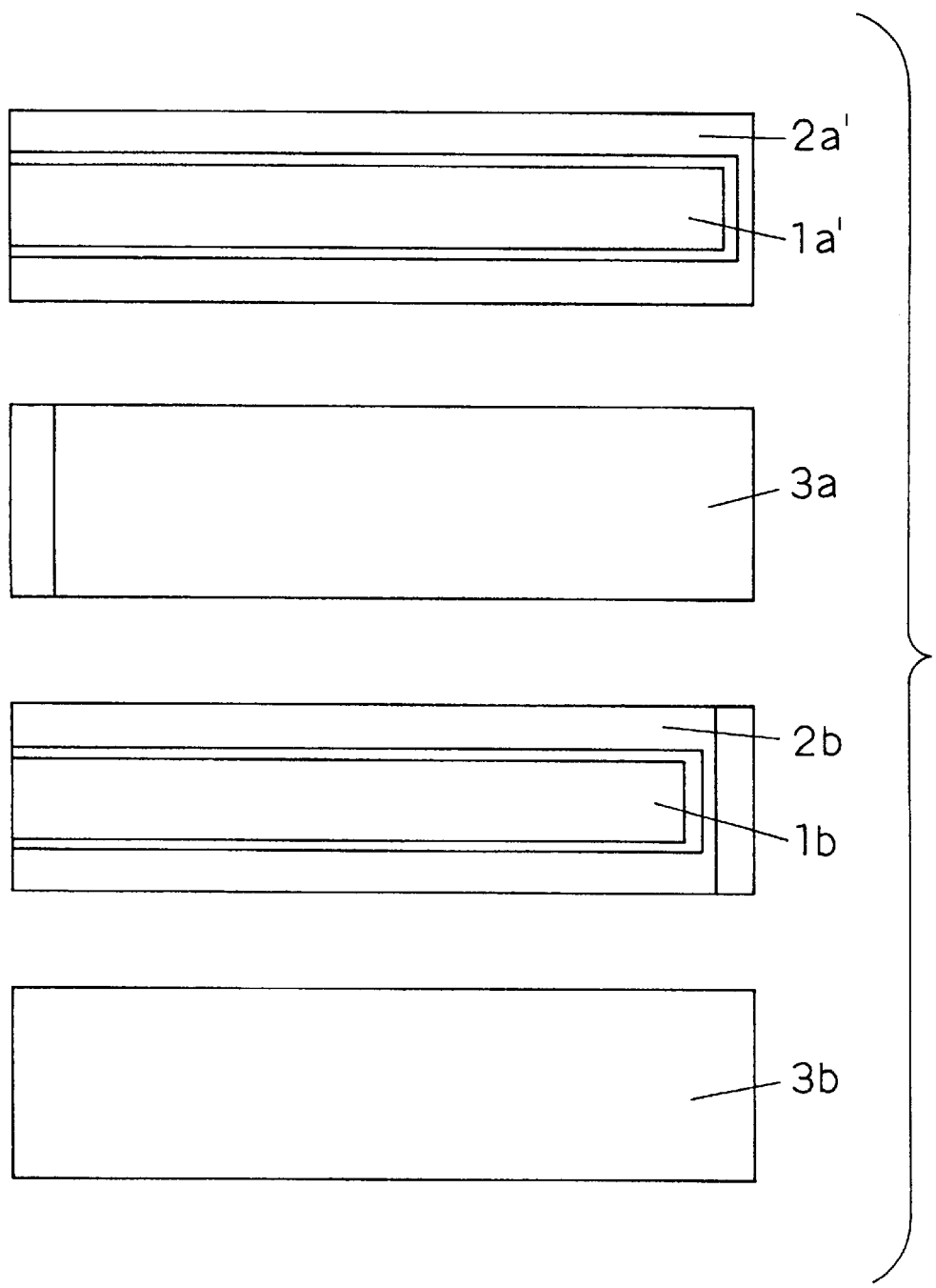
FIG. 20 is a plan view of the electrodes of the piezoelectric element which is used in the acceleration sensor according to the preferred embodiment which is shown in FIG. 19.
Figure 21:
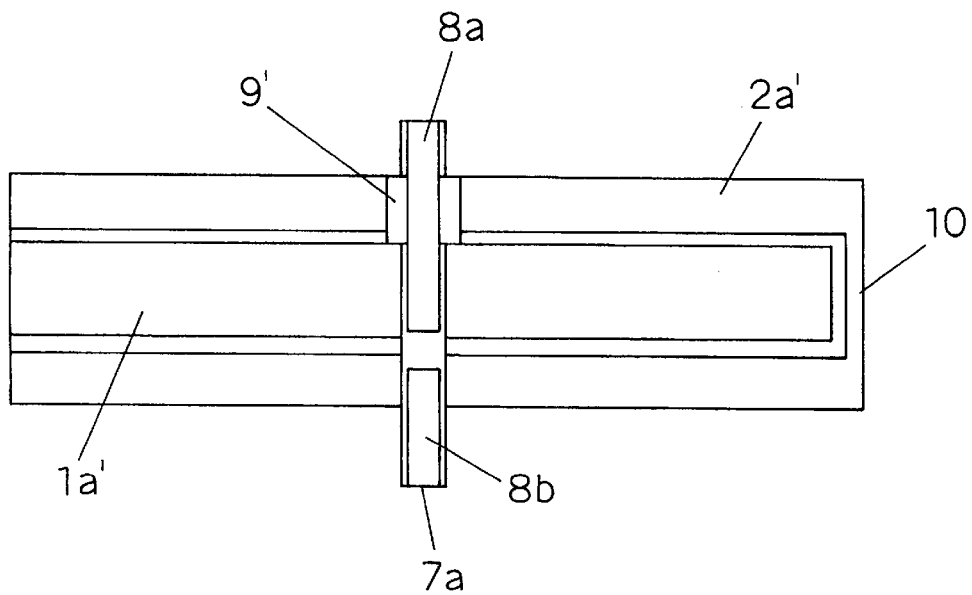
FIG. 21 is a plan view of a support member of the acceleration sensor according to the preferred embodiment which is shown in FIG. 19.

FIG. 19 is a view showing an outer appearance of a piezoelectric element of an acceleration sensor according to other preferred embodiment of the present invention, FIG. 20 is a plan view of electrodes in respective layers of the piezoelectric element, and FIG. 21 is a plan view of a support member of the acceleration sensor according to this preferred embodiment.

An electrode 1*a* is disposed at a central portion of the element along the longer sides of the piezoelectric element 100', and the other electrode 2*a'* is disposed at a peripheral portion. The electrode 2*a'* which is formed at a peripheral portion is mutually connected by a connection portion 10 which is disposed at one edge. Assuming that the electrode 1*a'* of the inward side is the drive electrode in this structure, the drive electrode extends all over the entire length along the longer sides and is located at the central portion, and therefore, it is possible to provide more uniform drive to the entire element than where other electrode structure is used, and it is hence possible to perform self diagnosis in a condition which is closer to a condition with an acceleration applied. Retrieval to external electrodes from the electrodes is realized through conductive layers 8*a* and 8*b* which are formed in a support member 7*a.* For connection with the electrode 1*a* which is disposed at the central portion, an insulation layer 9' may be disposed on the electrodes such that short-circuit with the electrode 2*a'* which is formed at the peripheral portion is prevented. The insulation layer may be an $SiO_2$ film, an $Si_3N_4$ film, a polyimide film, etc. Alternatively, an insulation adhesive such as an epoxy resin and a silicon resin may be applied for coating to thereby obtain the insulation layer. In addition, connection with the electrode of the peripheral portion may be realized with leading to the external electrode, instead of providing the connection portion for the electrode surface.

Sixth Preferred Embodiment

Figure 22:
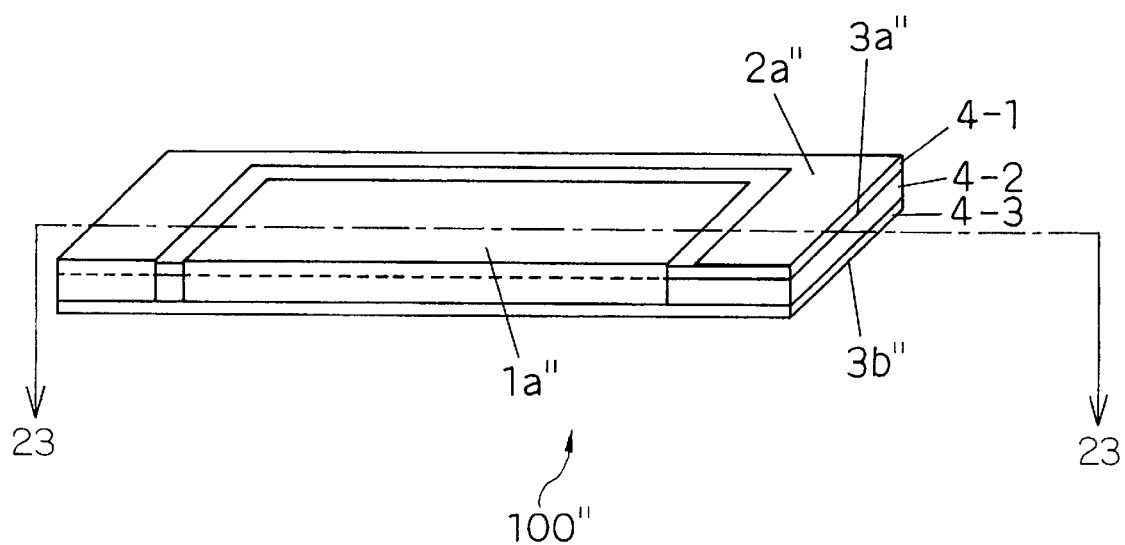
FIG. 22 is a view showing an outer appearance of a piezoelectric element which is used in an acceleration sensor according to a sixth preferred embodiment of the present invention.

FIG. 22 is a view showing an outer appearance of a piezoelectric element which is used in an acceleration sensor according to a preferred embodiment of the present invention.

Figure 23:
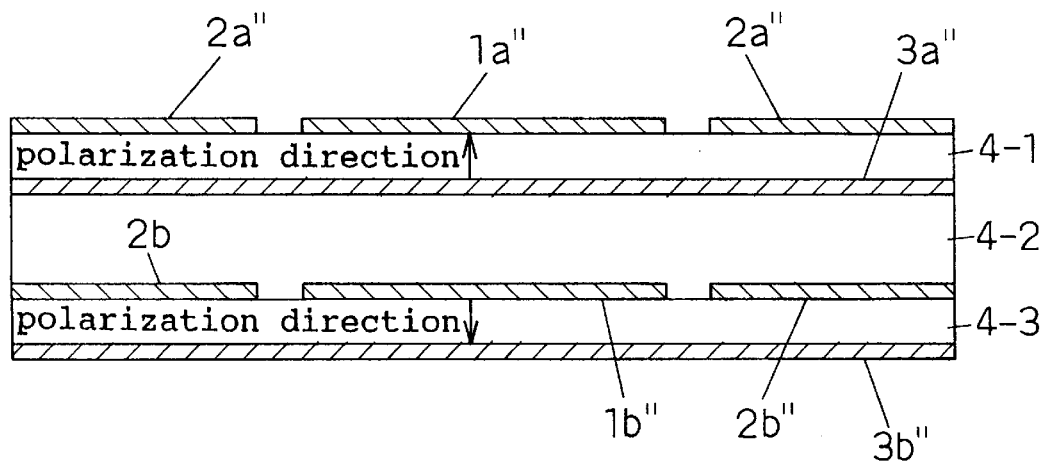
FIG. 23 is a cross sectional view of the piezoelectric element which is used in the acceleration sensor according to the sixth preferred embodiment of the present invention.
Figure 24:
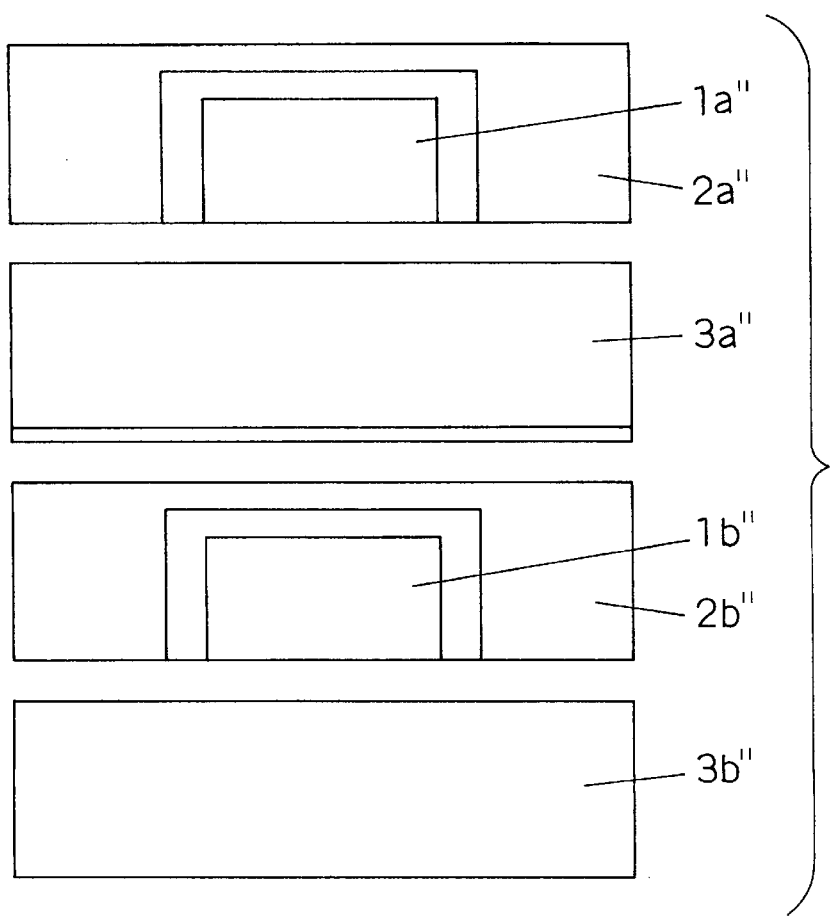
FIG. 24 is a plan view of electrodes of the piezoelectric element which is used in the acceleration sensor according to the sixth preferred embodiment of the present invention.

The piezoelectric element 100" has a structure of a rectangular shape which is formed by a stack of three layers 4-1, 4-2 and 4-3. Each layer is formed by a sheet-like shaped ceramic which mainly contains lead zirconate titanate. As to the thicknesses of the respective layers, the layer 4-1 and the layer 4-3 have a thickness of 50 μm, while the layer 4-2 has a thickness of 100 μm. Preferably, the thicknesses of the layers are about 10 to 100 μm. The total thickness is desirably 150 to 350 μm. Since sheet-like shaped ceramics are stacked and sintered, each layer is formed thinner, and therefore, an electrostatic capacitance of each layer is larger than where piezoelectric ceramic plates are bonded to each other. Two electrodes 1a" and 2a" are disposed in space from each other in the top surface of the layer 4-1. The electrode 1a" is in the vicinity of a central portion for supporting, to serve as the vibration detection electrode. The electrode 2a" is formed at the both edges of the rectangle in the longitudinal direction, to serve as the drive electrode for self diagnosis. The drive electrodes at the both edges are connected to each other by a connection portion which is formed along the longer sides of the piezoelectric element. Further, although not shown in FIG. 22, an electrode 3b" is formed in the bottom surface of the layer 4-3. The electrode 1a and the electrode 2b" are formed contiguous to each other in a portion at edge surfaces. Depending on a temperature for sintering, silver-palladium is used for the internal electrode and the surface electrode and silver is used for the electrodes at the edge surfaces. FIG. 23 is a cross sectional view of the piezoelectric element 100" along the longitudinal direction. FIG. 24 is a plan view of the electrodes in the respective layers. The electrodes 1b" and 2b" which are disposed between the layer 4-2 and the layer 4-3 have approximately the same shapes as those of the electrodes 1a" and 2a" which are disposed in the surface of the layer 4-1. The electrode 1b" is formed in the vicinity of the central portion for supporting, to serve as the vibration detection electrode. The electrode 2b" is connected to the both edges of the rectangle in the longitudinal direction through the center of the longer sides of the piezoelectric element, to serve as the drive electrode for self diagnosis. Although not shown in FIG. 22, the electrode 1a" is connected to the electrode 1b" which is disposed between the layer 4-2 and the layer 4-3 at the edge surface, while the electrode 2a" is connected to the internal electrode 2b". In a similar manner, the electrode 3b" at the bottom surface and the electrode 3a which is disposed between the layer 4-1 and the layer 4-2 are connected to each other on the opposite side to the electrode 1. To prevent short-circuit between the electrodes 1a", 1b" and the connection portion or short-circuit between the electrodes 2a", 2b" and the connection portion, the electrode 3a" is disposed somewhat retracted from the edge.

The layers 4-1 and 4-3 are polarized, and the polarization directions are opposite to each other. The layer 4-2 is not polarized.

As the electrodes are connected in such a manner, an impedance which are formed by the layer 4-1 and electrodes on the both surfaces thereof and an impedance which is formed by the layer 4-3 and electrodes on the both surfaces thereof are electrically connected parallel to each other.

Hence, an electrostatic capacitance of the piezoelectric element as a whole is a sum of the electrostatic capacitances of the respective layers. Further, since the respective layers are stacked each other, the respective as a whole layers only need to maintain a predetermined strength, and therefore, it is allowed to form each layer as a thin layer and increase the electrostatic capacitance of each other. In addition, since the electrostatic capacitances of the respective layers are added to each other to realize the entire electrostatic capacitance, it is possible to obtain a larger electrostatic capacitance than that of a piezoelectric element which is formed by one layer which has the same thickness.

Figure 25:
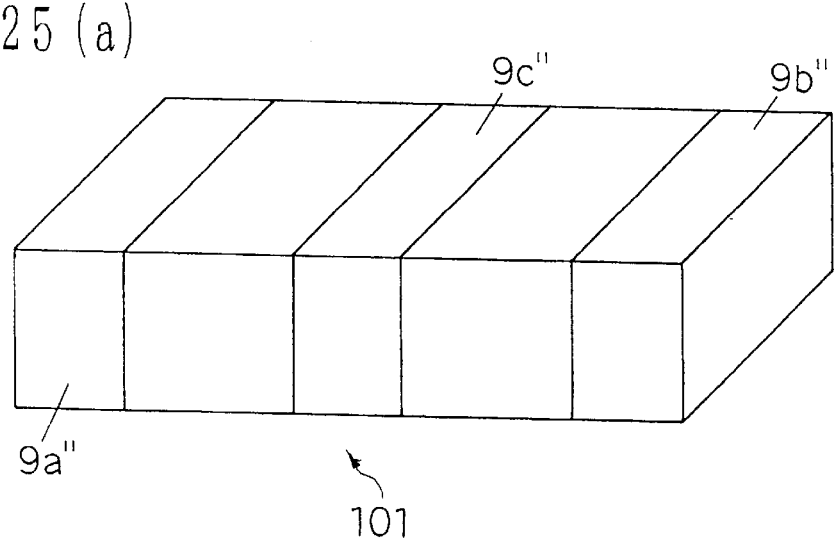
FIG. 25(a) is a view showing an outer appearance of the acceleration sensor according to the sixth preferred embodiment of the present invention.
FIG. 25(b) is a cross sectional view of the acceleration sensor according to the sixth preferred embodiment of the present invention.
Figure 25:
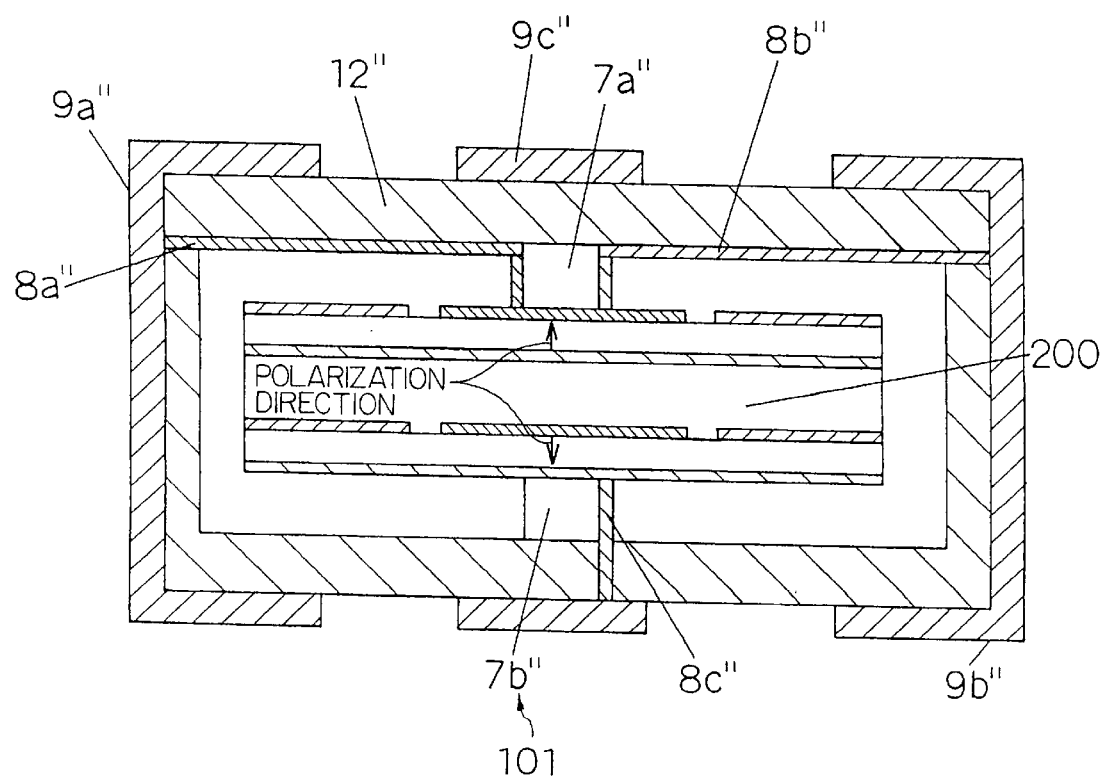

FIG. 25 (a) is a view showing an outer appearance of an acceleration sensor which uses the piezoelectric element as that shown in FIGS. 22 through 24, and FIG. 25(b) is a cross sectional view of the acceleration sensor. The piezoelectric element 100 is supported at a central portion thereof in the longitudinal direction by support members 7a" and 7b", and housed inside a container 12". The container 12 is made of alumina. Outside the container 12", external electrodes 9a", 9b" and 9c" are disposed. The external electrodes 9a", 9b" and 9c" are obtained by forming solder layers on Ni. The external electrodes 9a", 9b" and 9c" are connected to the electrodes 1a", 2a" and 3b" by conductive layers 8a", 8b" and 8c", respectively, through the support members 7a" and 7b", so that it is possible to retrieve electric charges which are generated by an acceleration outside the container 12".

Figure 26:
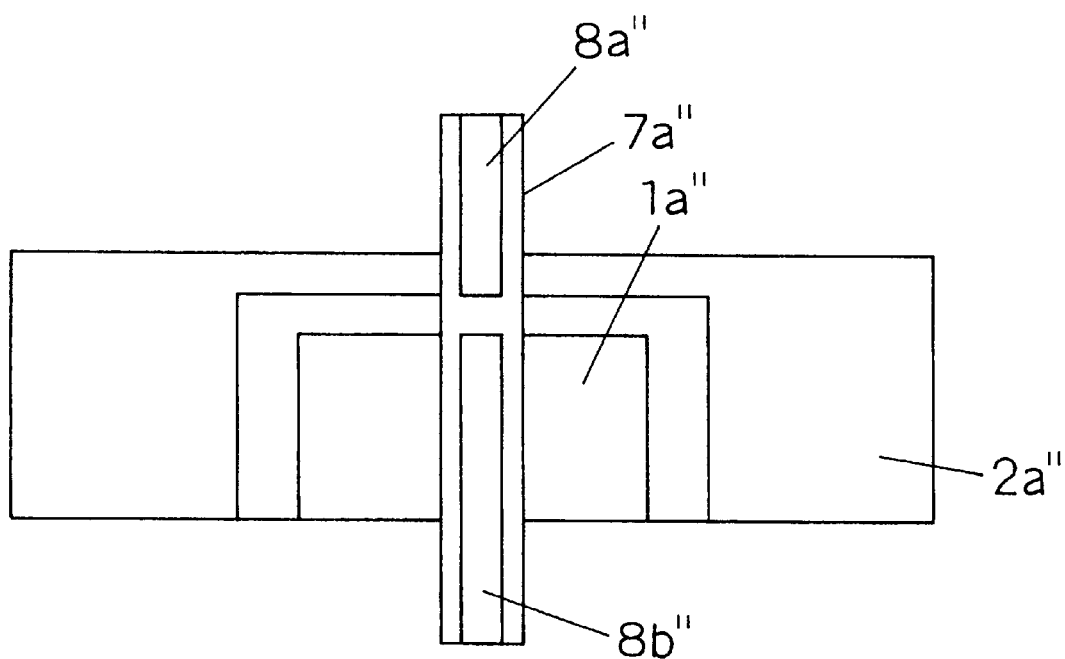
FIG. 26 is a plan view of a support member of the acceleration sensor according to the sixth preferred embodiment of the present invention.

FIG. 26 shows the conductive layers of the support member 7a". As shown in FIG. 16, the conductive layers 8a" and 8b" are disposed in a contact surface of the support member 7a" which contacts the piezoelectric element. The conductive layers 8a" and 8b" are connected in contact with the electrodes 1a" and 2a" which are disposed at the surface of the piezoelectric element 100". Further, the conductive layers 8a" and 8b" are electrically connected to the external electrodes 9a" and 9b", for retrieval of electric charge to outside. The conductive layer 8" and the electrodes 1a" and 2a" may be bonded to each other using a conductive adhesive agent.

As the piezoelectric element has a rectangle shape, as described earlier with reference to FIG. 5, even when the piezoelectric element is mounted upright, the height of the acceleration sensor is not high, and therefore, it is possible to realize a small-size acceleration sensor.

Further, when an acceleration is applied in the vertical direction, as described earlier with reference to FIG. 6, it is possible to obtain a large quantity of electric charges.

Thus, while a large distortion is created between the front surface and the back surface of the piezoelectric element, since the polarized piezoelectric member layers are disposed in this preferred embodiment, it is possible to enhance the sensitivity as well.

In addition, although the piezoelectric element is distorted largely in the vicinity of the center at which the piezoelectric element is held but distorted less at the edge, since the electrode for detection of vibration is disposed in the portion in the vicinity of the center at which the piezoelectric element is held in this preferred embodiment, it is possible to enhance the sensitivity.

Figure 27:
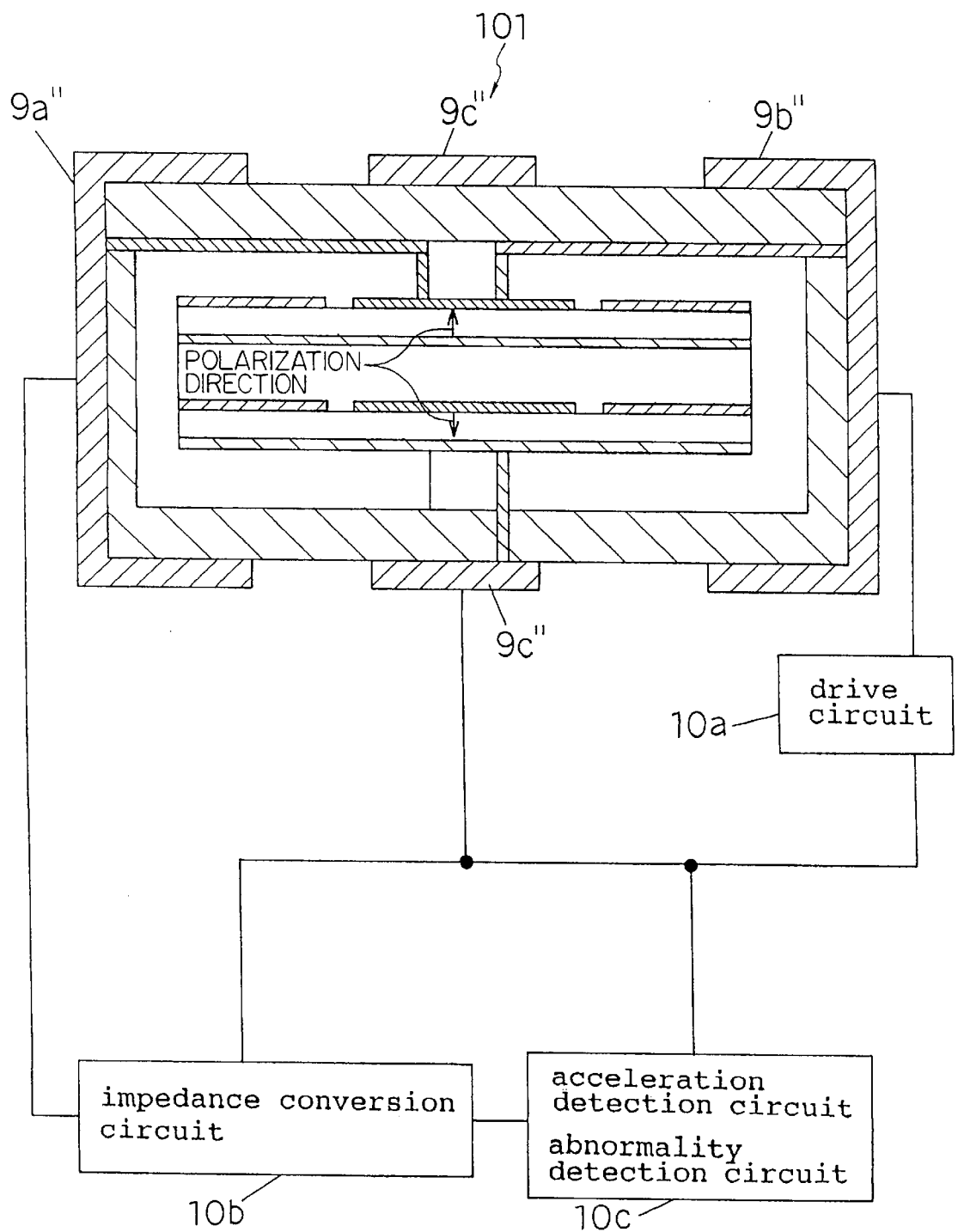
FIG. 27 is a block diagram showing signal processing using the acceleration sensor according to the sixth preferred embodiment of the present invention.

FIG. 27 is a block diagram showing an acceleration detection apparatus which has a self diagnosis function using an acceleration sensor. During self diagnosis, the electrodes 2a" and 2b" are used as the drive electrode and the electrodes 1a" and 1b" are used as the vibration detection electrode. The electrodes 3a" and 3b" serve as a common electrode, and are grounded through the external electrode 9c". The external electrode 9b" is connected to a drive circuit 10a for driving vibration for the purpose of self diagnosis. The drive circuit 10a generates an a.c. drive voltage which will be applied to the electrode 2", which is the drive electrode for driving the piezoelectric element, and the electrode 3 through the external electrodes 9b" and 9c". The a.c. voltage develops electric fields inside the layer 4-1 and the layer 4-3. Although the electric fields are applied upon in the same direction, since the polarization directions are different from each other, distortions of opposite directions are created and the piezoelectric element as a whole bends and vibrates. The vibration generates electric charges as described above, which are detected by the electrodes $1a''$ and $1b''$, which serve as the vibration detection electrode, and the electrodes $3a''$ and $3b''$. The detected electric charges are supplied to the external electrodes $9a''$ and $9c''$ which are connected to an impedance conversion circuit $10b$. The impedance conversion circuit $10b$ is formed by an FET or the like, in general. An output voltage from the impedance conversion circuit $10b$ is supplied to an acceleration detection circuit and an abnormality detection circuit $10c$ which determines whether the piezoelectric element is abnormal. In general, the abnormality detection circuit $10c$ is formed by a high pass filter, a low pass filter, a smoothing circuit, a comparator, etc. An abnormality diagnose is realized by judging whether the abnormality detection circuit $10b$ outputs a voltage which matches a predetermined value in response to the a.c. voltage which is supplied from the transmitter $10a$. When the piezoelectric element is abnormal, the abnormality detection circuit supplies an instruction which demands processing for dealing with abnormality.

Since the drive electrode portion is stacked, each layer is thin and has a large electric fields. This allows a supply of the a.c. voltage having a small amplitude from the oscillation circuit to obtain bending and vibration of a large amplitude, thereby improving the accuracy of self diagnosis.

Further, the detection electrode portion as well is stacked, and therefore, the electrostatic capacitance is large. Hence, it is possible to detect vibration which is induced by the oscillation circuit with a high sensitivity without using a high-resistance resistor for the impedance conversion circuit, which in turn makes it possible to perform accurate self diagnosis in a wide frequency range.

During regular detection of an acceleration as well, since the thin layers are stacked one atop the other and the respective layers are connected parallel to each other in the piezoelectric element $100''$, the electrostatic capacitance of the piezoelectric element as a whole is large. Further, it is possible to form each layer thin without damaging the mechanical strength of the piezoelectric element as a whole. Hence, it is possible to obtain a sufficiently high sensitivity to deal with an acceleration with a low frequency, and therefore, to measure without using a high-resistance resistor.

During regular detection of an acceleration, the drive electrodes $2a''$ and $2b''$ and the vibration detection electrodes $1a''$ and $1b''$ may be used as the electrode for detecting an acceleration and connected to the impedance conversion circuit to obtain an even higher sensitivity.

Although the layer 4-2 is not polarized, as this layer is disposed, even though the layer 4-1 and the layer 4-3 are formed extremely thin, it is possible to maintain the strength of the piezoelectric element as a whole. Further, the layer 4-2 has an effect of increasing the electrostatic capacitance.

Next, a description will be given on comparison of an acceleration sensor which is fabricated using the electrodes (See FIG. 3) of the piezoelectric element which is used for the acceleration sensor according to the first preferred embodiment (The layer 4-1 and the layer 4-3 are 50 $\mu$m, the layer 4-2 is 100 $\mu$m, the piezoelectric element has a size of 1.3 mm×8.0 mm×0.2 mm, and the vibration detection electrode and the drive electrode each have a size of 0.5 mm×7.8 mm.) with acceleration sensors which are each fabricated using the electrodes (See FIG. 24) of the piezoelectric element which is used for the acceleration sensor according to the sixth preferred embodiment (The layer 4-1 and the layer 4-3 are 50 $\mu$m, the layer 4-2 is 100 $\mu$m, the piezoelectric element has a size of 1.3 mm×8.0 mm×0.2 mm, the detection electrode has a width of 1.0 mm and varying lengths of 2 mm, 3 mm, 4 mm, 5 mm and 6 mm in the longitudinal direction about the point of supporting, and the drive electrode is formed in a remaining portion except an insulation portion which has a width of 0.2 mm.).

Table 1 shows surface area sizes, the sensitivities, products of the capacitances and the sensitivities, etc., of these acceleration sensors which are fabricated as such.

Table 1

Even if the same quantity of electric charges are created, when the capacitance is large, the sensitivity is low. Where the vibration detection portions of the acceleration sensors according to the sixth preferred embodiment have approximately the same capacitance as that of the vibration detection portion of the acceleration sensor according to the first preferred embodiment, it is understood from Table 1 that the sensitivity is doubled. This is apparent from comparison of the acceleration sensor according to the first preferred embodiment with the acceleration sensor NO. 3 according to the sixth preferred embodiment, for example. Further, any one of the sensors which have the various lengths of the vibration detection electrode portion has a largely improved sensitivity. While the products of the capacitances and the sensitivities denote quantities of electric charges, the quantities of electric charges with the acceleration sensors according to the sixth preferred embodiment are 1.5 times as large as that with the acceleration sensor according to the first preferred embodiment. In short, as the vibration detection electrode is disposed in the vicinity of supporting, the sensitivity is improved, a noise is reduced, and moreover, amplification is possible with only one-stage amplifier which simplifies the circuit.

The self diagnosis circuit and the impedance conversion circuit are not limited to as those shown in FIG. 27.

The directions of polarization are not limited to as those shown in the drawings. It is only necessary that the directions of polarization are opposite to each other.

Seventh Preferred Embodiment

Figure 28:
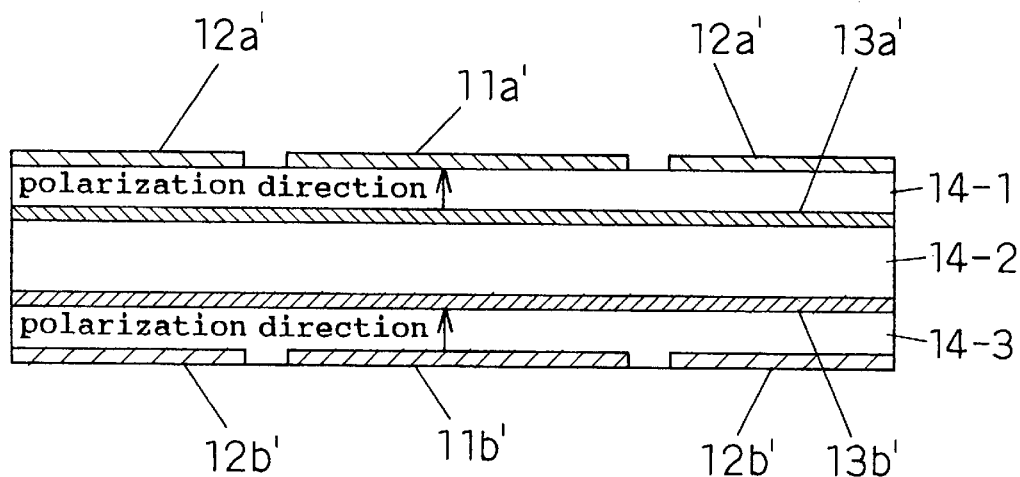
FIGS. 28(a) are cross sectional views of a piezoelectric element which is used in an acceleration sensor according to a seventh preferred embodiment of the present invention.
FIG. 28(b) is a view showing an outer appearance of the piezoelectric element of FIG. 28(a).
Figure 28:
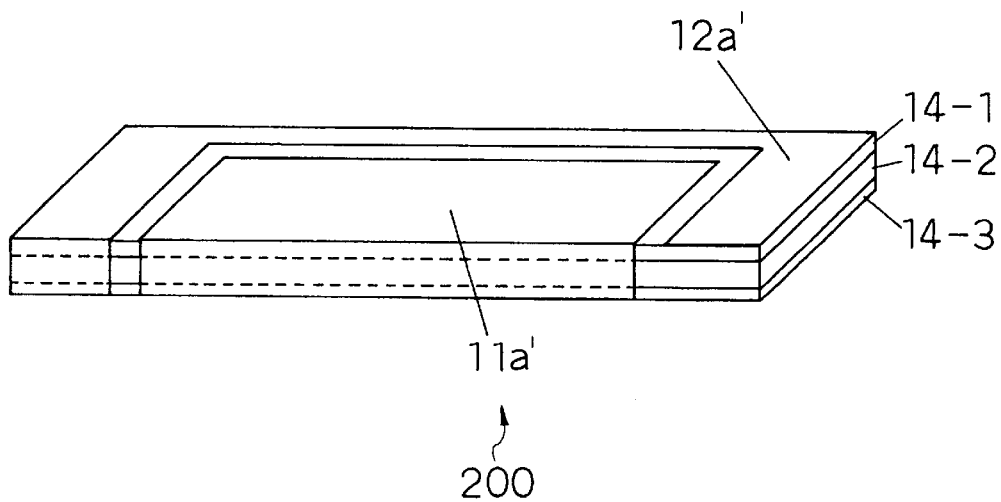

FIG. 28A is a cross sectional view of a piezoelectric element of an acceleration sensor according to other preferred embodiment of the present invention. FIG. 28B is a perspective view of the piezoelectric element.

Figure 29:
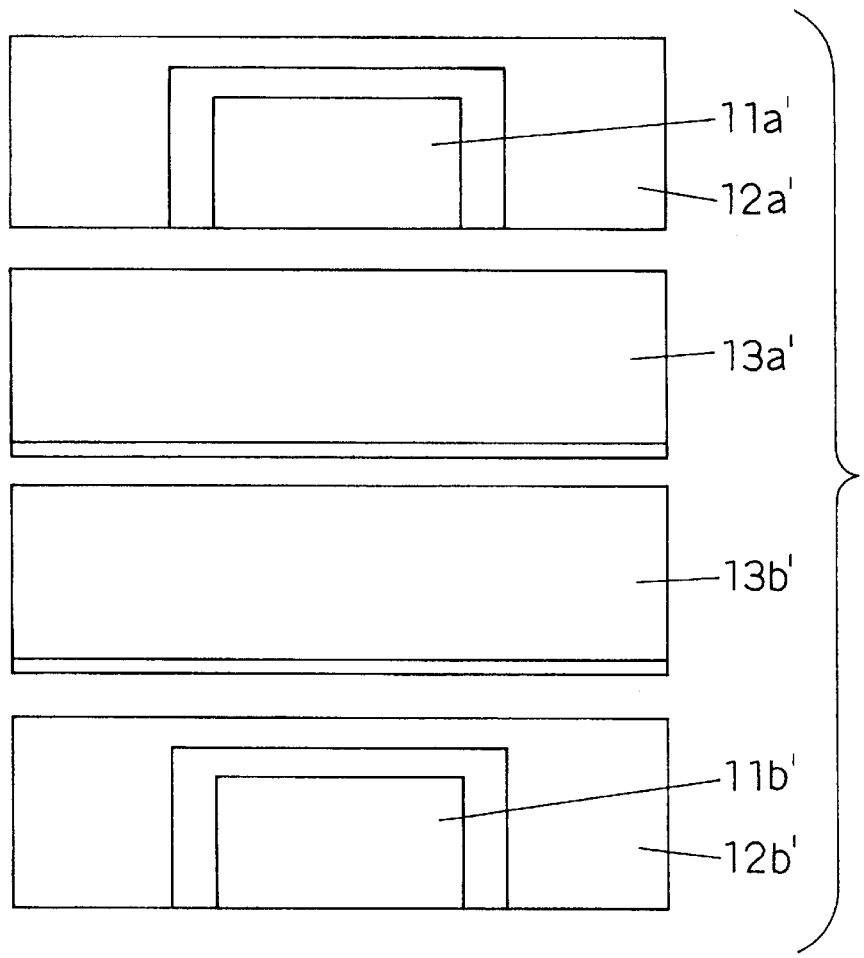
FIG. 29 is a plan view of electrodes of the piezoelectric element which is used in the acceleration sensor according to the seventh preferred embodiment of the present invention.

The piezoelectric element 200 has a structure of a rectangular shape which is formed by a stack of three layers 14-1, -2 and -3. The layers 14-1 and 14-3 are polarized, and the polarization directions are the same. FIG. 29 is a plan view of electrodes of the piezoelectric element. Two electrodes $11a'$ and $12a'$ are disposed in space from each other in the top surface of the layer 14-1. The electrode $11a'$ is formed in the vicinity of a central portion for supporting, to serve as the vibration detection electrode. The electrode $12a'$ is formed at the both edges of the rectangle in the longitudinal direction, to serve as the drive electrode for self diagnosis, and mutually connected by a connection portion which is formed in the vicinity of the center of the longer sides of the piezoelectric element. Electrodes $13a'$ and $13b'$ are the piezoelectric element approximately over the entire surface, except at the edge surfaces and portions around the same which serve as connection portions with the electrodes $11'$ and $12'$, and connected to each other on the opposite side to the connection portions with the electrodes $11'$ and $12'$.

The layers 14-1 and 14-3 are connected parallel to each other, so that the electrostatic capacitance of the piezoelectric element is a sum of the capacitances of the respective layers, which is large.

The layers 4-1, 4-2 and 4-3 are each formed by a sheet-like shaped ceramic which mainly contains lead zirconate titanate. Silver-palladium is used as the electrodes.

Although the polarization directions of the layers 14-1 and 14-3 are the same, since the electrodes are connected in a different direction than that shown in FIG. 2, electric charges of the same polarity are created at the electrode 11a' and the electrode 11b' as a result of bending and vibration, and therefore, it is possible to detect an acceleration.

The layer 14-2 plays a role of enhancing the strength of the piezoelectric element 200 and increasing the shock resistance.

Meanwhile in the first preferred embodiment an impedance which is formed by the unpolarized layer 4-2 in the middle and electrodes 3a, 1b is electrically connected parallel to the impedance which is formed by the layer 4-1 and electrodes 1a, 3a and to the impedance which is formed by the layer 4-3 and electrodes 1b, 3b and such impedance of the unpolarized layer 4-2 serves as total impedance of whole element. But such unpolarized layer 4-2 does not generate electric charge when it is applied with acceleration and then the electric charge reduces the output and make the sensitivity of the acceleration sensor inferior. However, since the layer 14-2 according to the seventh preferred embodiment has the opposed surface disposed between the electrodes 13a' and 13b', the electrostatic capacitance of this layer fails to be added to the electrostatic capacitances of the layer 14-1 and the layer 14-2 and accordingly increases the sensitivity.

Self diagnosis is performed in a similar manner to that shown in FIG. 7, using the electrode 11' as the vibration detection electrode and the electrode 12' as the drive electrode.

A conductive layer for retrieval of electric charges from the electrodes as well is realized through the support members, in a similar manner to that shown in FIG. 5.

An acceleration sensor was fabricated using the electrodes which are shown in FIG. 29 of the piezoelectric element according to the seventh preferred embodiment, such that the layer 4-1 and the layer 4-3 were 50 µm, the layer 4-2 was 100 µm, and the piezoelectric element had a size of 1.3 mm×8.0 mm×0.2 mm. As in the sixth preferred embodiment, the vibration detection electrode according to the seventh preferred embodiment was formed to have a width of 1.0 mm and various lengths and the drive electrode for self diagnosis was formed in the remaining portion. The sensitivity at 40 Hz and an output indicating the self diagnosis sensitivity upon application of 1 V of the fabricated acceleration sensor were higher by 25% than the case of the first preferred embodiment. Thus, as the vibration detection electrode is disposed in the vicinity of supporting, the sensitivity is improved, a noise is reduced, and moreover, amplification is possible with only one-stage amplifier which simplifies the circuit.

Eighth Preferred Embodiment

Figure 30:
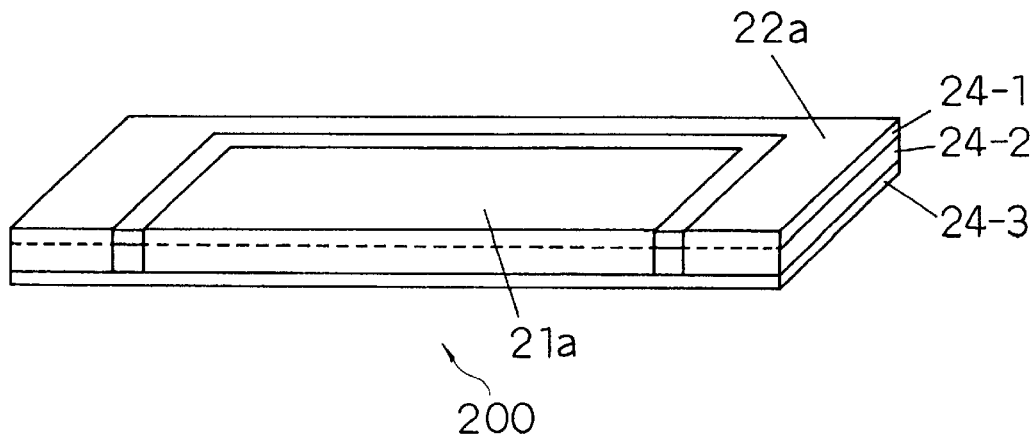
FIG. 30 is a view showing an outer appearance of a piezoelectric element which is used in an acceleration sensor according to an eighth preferred embodiment of the present invention.
Figure 31:
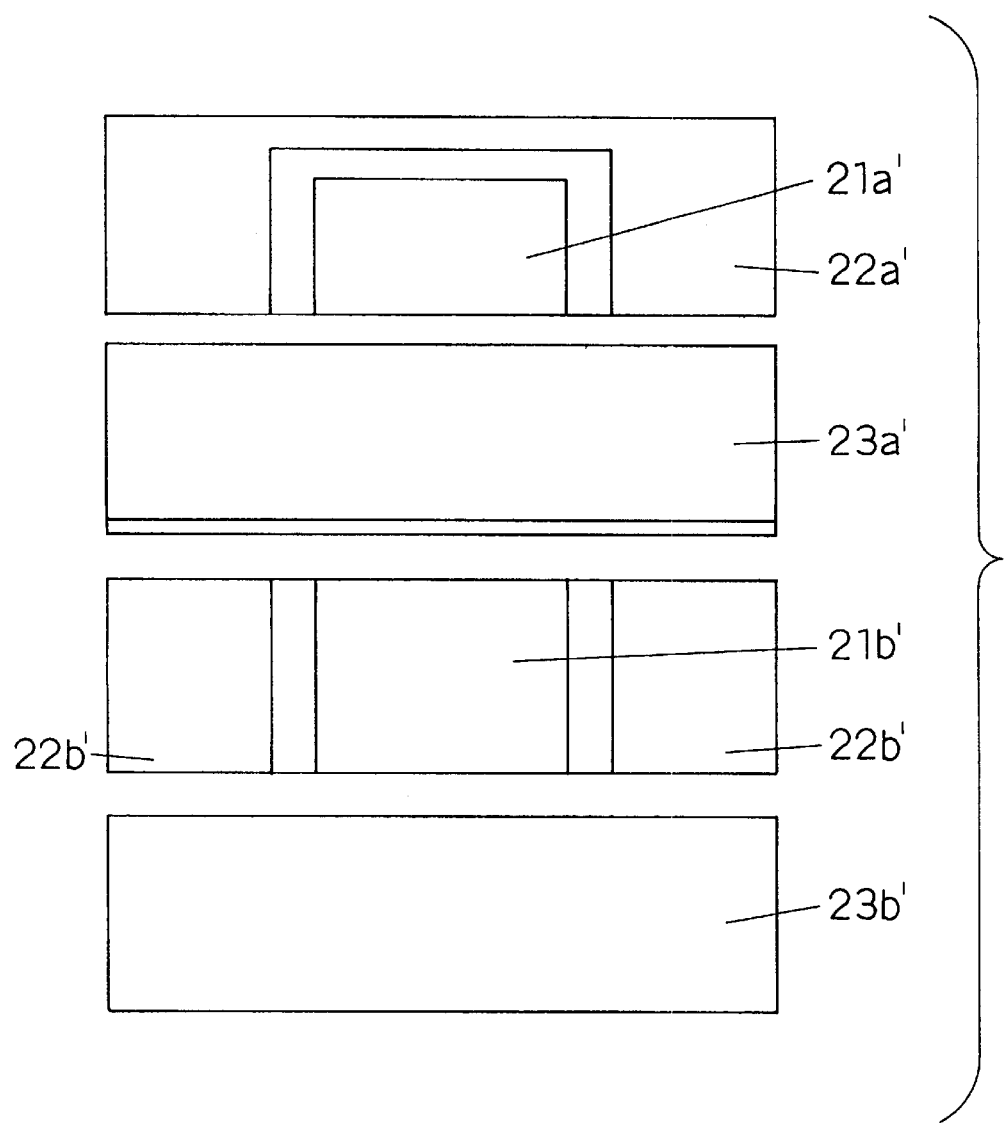
FIG. 31 is a plan view of electrodes of the piezoelectric element which is used in the acceleration sensor according to the eighth preferred embodiment of the present invention.

FIG. 30 is a view showing an outer appearance of a piezoelectric element of an acceleration sensor according to other preferred embodiment of the present invention, and FIG. 31 is a plan view of electrodes in respective layers of the piezoelectric element.

The piezoelectric element 200 is formed as a disk which includes a through hole 35 at the center, and has a stacked structure of three layers 24-1, -2 and -3. The layers 24-1 and 24-2 are polarized in opposite directions to each other.

Electrodes 21a' and 22a' are disposed in the top surface of the piezoelectric element 200, an electrode 23a' is disposed between the layer 24-1 and the layer 24-2, electrodes 21b and 22b' are disposed between the layer 24-2 and the layer 24-3, and an electrode 23b' is disposed in the bottom surface. Two electrodes 21a and 22a are disposed in space from each other in the top surface of the layer 24-1. The electrode 21a is formed in the vicinity of a central portion for supporting, to serve as the vibration detection electrode. The electrode 22a' is formed at the both edges of the rectangle in the longitudinal direction, to serve as the drive electrode for self diagnosis, and mutually connected by a connection portion which is formed in the vicinity of the center of the longer sides of the piezoelectric element. The electrode 21b' is formed in the vicinity of a central portion for supporting in such a manner that the electrode 21b' is disposed exactly over the width of the piezoelectric member layer, to serve as the vibration detection electrode. The electrode 22b' is formed at the both edges of the rectangle in the longitudinal direction, to serve as the drive electrode for self diagnosis. The electrodes 21a' and 21b' are connected to each other at an edge surface along the longer sides of the piezoelectric element 200, so are the electrodes 22a and 22b. Electrodes 23a' and 23b' are disposed approximately over the entire surface of the piezoelectric element 200 except at connection portions with the electrodes 21' and 22', and connected to each other at the edge surface at the opposite longer side.

As the electrodes are connected in such a manner, a capacitor which is formed by the layer 24-1 and a capacitor which is formed by the layer 24-3 are connected parallel to each other, thereby increasing the electrostatic capacitance of the piezoelectric element. Further, since the electrode 21b' is formed in the vicinity of the central portion for supporting in such a manner that the electrode 21b' is disposed exactly over the width of the piezoelectric member layer, a large quantity of electric charges are created, the sensitivity is further improved, a noise is reduced, and moreover, amplification is possible with only one-stage amplifier which simplifies the circuit. In addition, since the structure is a stacked structure and the layer 24-2 which is not polarized enhances the shock resistance, it is possible to form each layer thin and increase the electrostatic capacitance.

The piezoelectric element 200 is supported at the center thereof in the longitudinal direction in a similar manner to that shown in FIG. 4, and a conductive layer is formed in a surface which contacts with the electrode surface of a support member in a similar manner to that shown in FIG. 5.

Operations for detecting an acceleration upon application of the acceleration are similar to those shown in FIG. 6.

Self diagnosis is performed in a similar manner to that shown in FIG. 7, using the electrode 21' as the vibration detection electrode and the electrode 22' as the drive electrode.

Materials for forming the piezoelectric member layers and the electrodes and the element size are similar to those used in the first preferred embodiment.

Ninth Preferred Embodiment

Figure 32:
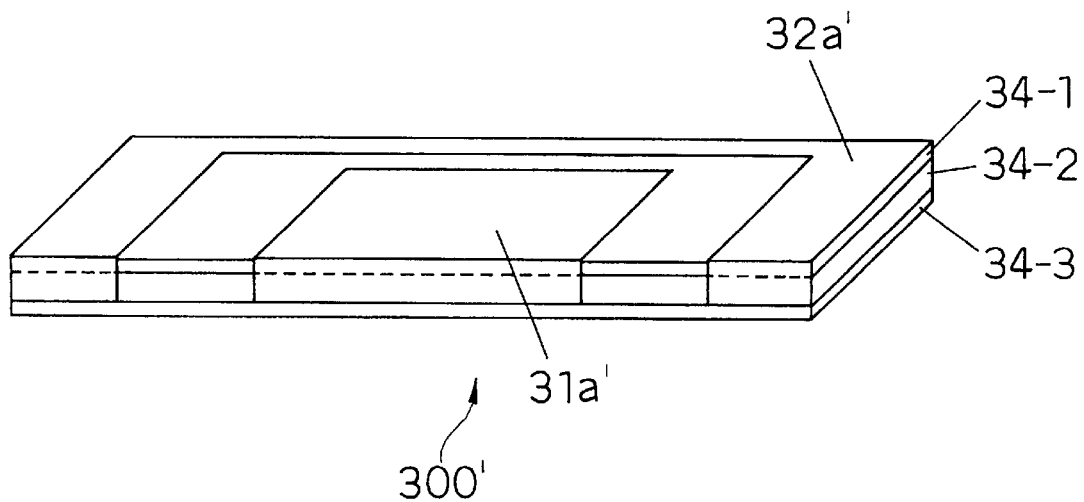
FIG. 32 is a view showing an outer appearance of a piezoelectric element which is used in an acceleration sensor according to a ninth preferred embodiment of the present invention.
Figure 33:
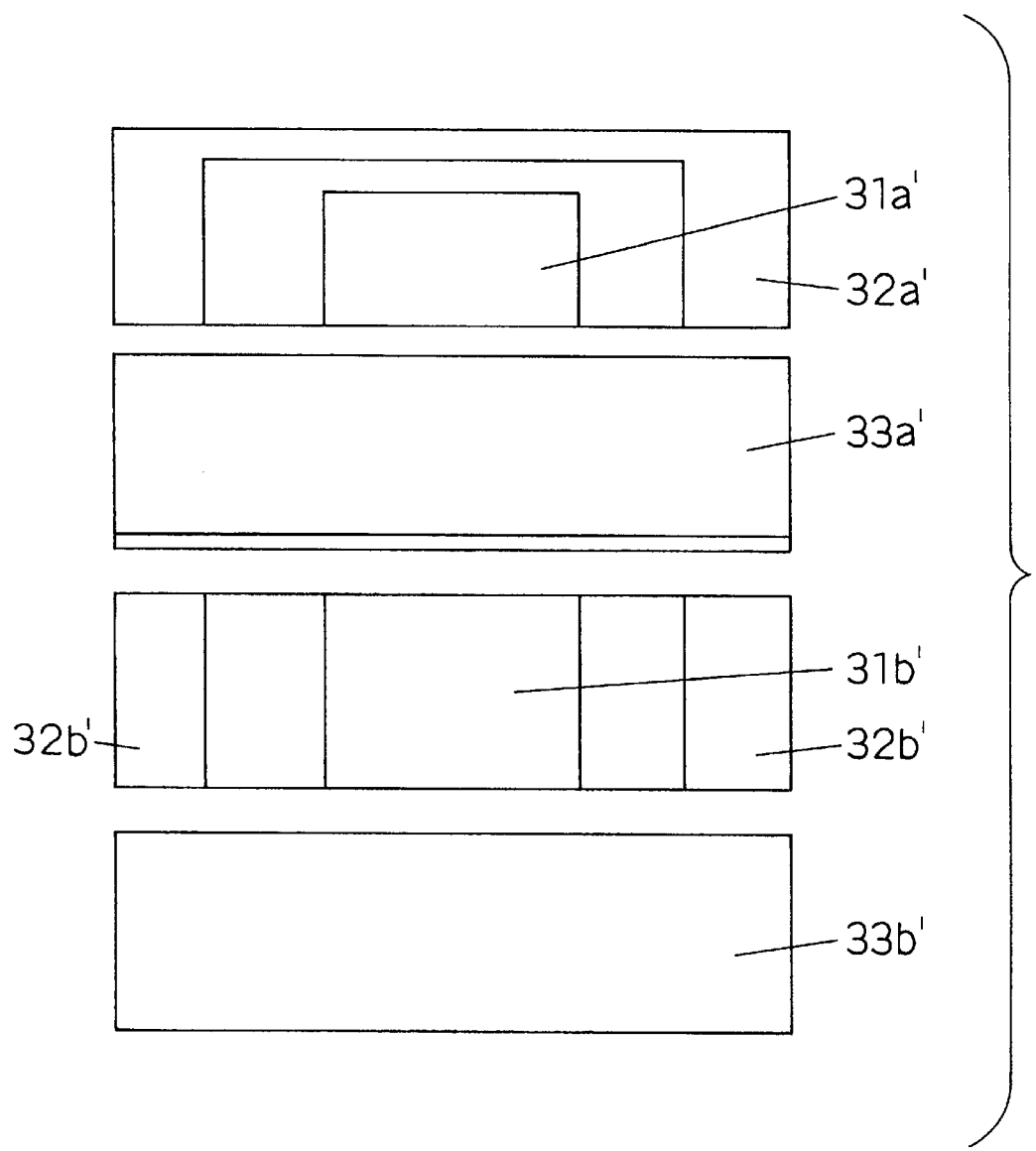
FIG. 33 is a plan view of electrodes of the piezoelectric element which is used in the acceleration sensor according to the ninth preferred embodiment of the present invention.

FIG. 32 is a view showing an outer appearance of a piezoelectric element of an acceleration sensor according to other preferred embodiment of the present invention, and FIG. 33 is a plan view of electrodes in respective layers of the piezoelectric element.

The piezoelectric element 300' has a structure of a rectangular shape which is formed by a stack of three layers 34-1, -2 and -3. The layers 34-1 and 34-2 are polarized in opposite directions to each other. Electrodes 31a' and 32a' are disposed in the top surface of the piezoelectric element 300, an electrode 33a' is disposed between the layer 34-1 and the layer 34-2, electrodes 31b' and 32b' are disposed between the layer 34-2 and the layer 34-3, and an electrode 33b' is disposed in the bottom surface. Two electrodes 31a' and 32a' are disposed in space from each other in the top surface of the layer 34-1. The electrode 31a' is formed in the vicinity of a central portion for supporting, to serve as the vibration detection electrode. The electrode 32a' is formed at the both edges of the rectangle in the longitudinal direction, to serve as the drive electrode for self diagnosis, and mutually connected by a connection portion which is formed in the vicinity of the center of the longer sides of the piezoelectric element. The electrodes 31a' and 32a' are formed with a predetermined distance from each other. The electrode 31b' is formed in the vicinity of a central portion for supporting, to serve as the vibration detection electrode. The electrode 32b is formed at the both edges of the rectangle in the longitudinal direction, to serve as the drive electrode for self diagnosis. The electrodes 31a' and 31b' are connected to each other at an edge surface along the longer sides of the piezoelectric element 300', so are the electrodes 32a' and 32b'. Electrodes 33a' and 33b' are disposed approximately over the entire surface of the piezoelectric element 300' except at connection portions with the electrodes 31' and 32', and connected to each other at the edge surface at the opposite longer side.

Since the vibration detection electrode 31' and the self diagnosis electrode 32' are disposed with the predetermined space between the same, it is possible to optionally change a ratio of the area size of the vibration detection electrode to the area size of the self diagnosis electrode, realize an appropriate electrostatic capacitance, and increase the degree of freedom in designing the circuit of the system.

Tenth Preferred Embodiment

Figure 34:
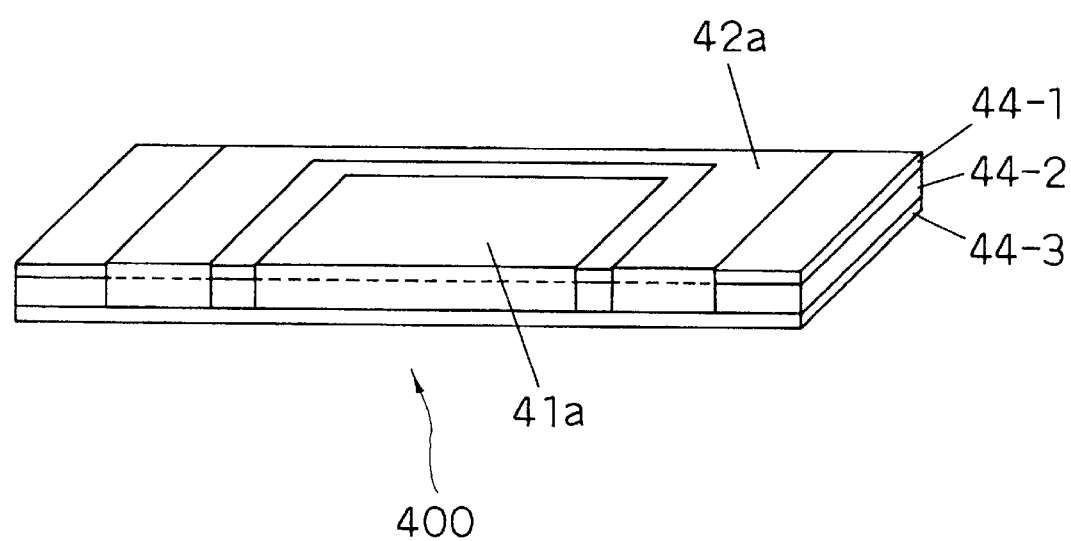
FIG. 34 is a view showing an outer appearance of a piezoelectric element which is used in an acceleration sensor according to a tenth preferred embodiment of the present invention.
Figure 35:
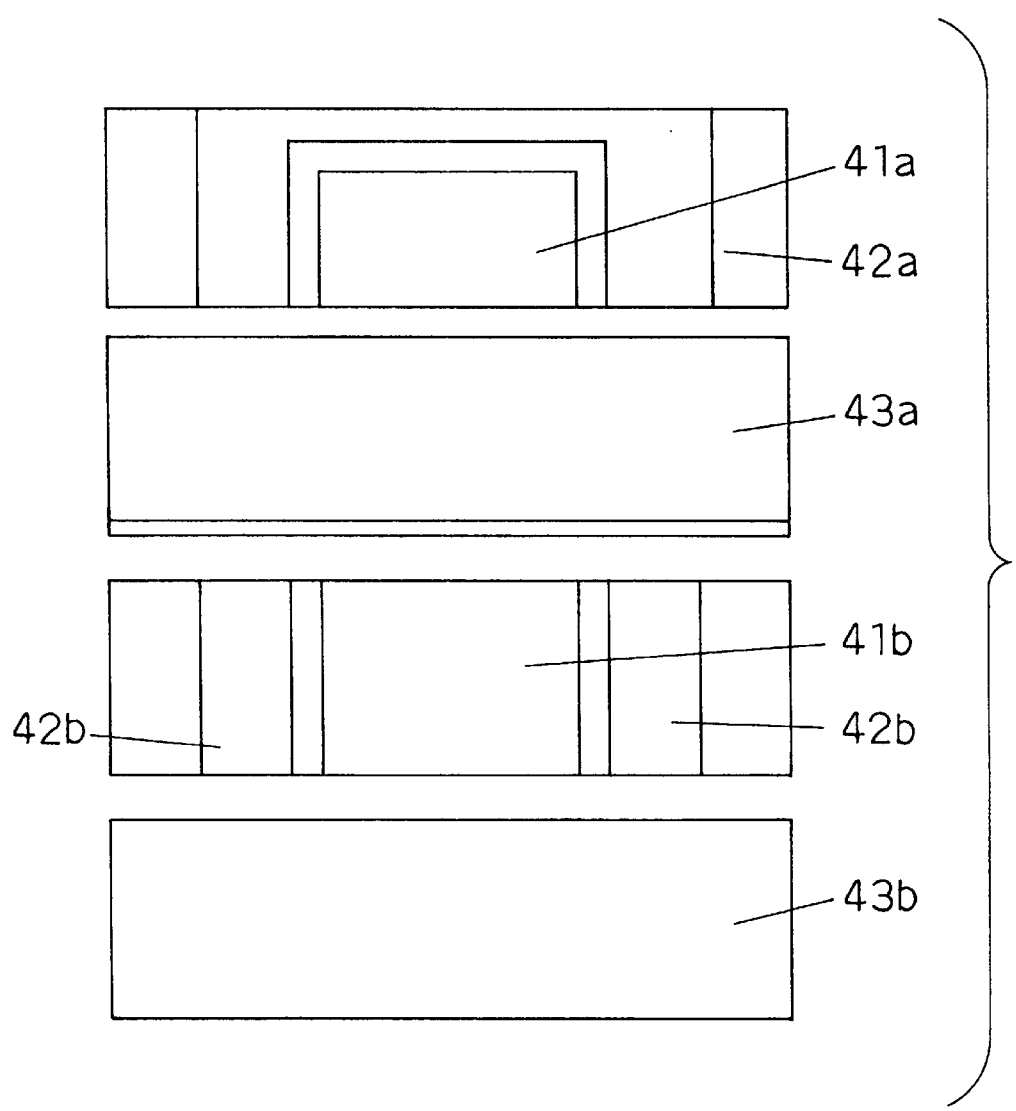
FIG. 35 is a plan view of electrodes of the piezoelectric element which is used in the acceleration sensor according to the tenth preferred embodiment of the present invention.

FIG. 34 is a view showing an outer appearance of a piezoelectric element of an acceleration sensor according to other preferred embodiment of the present invention, and FIG. 35 is a plan view of electrodes in respective layers of the piezoelectric element.

The piezoelectric element 400 has a structure of a rectangular shape which is formed by a stack of three layers 44-1, -2 and -3. The layers 44-1 and 44-2 are polarized in opposite directions to each other. Electrodes 41a and 42a are disposed in the top surface of the piezoelectric element 400, an electrode 43a is disposed between the layer 44-1 and the layer 44-2, electrodes 41b and 42b are disposed between the layer 44-2 and the layer 44-3, and an electrode 43b is disposed in the bottom surface. Two electrodes 41a and 42a are disposed in space from each other in the top surface of the layer 44-1. The electrode 41a is formed in the vicinity of a central portion for supporting, to serve as the vibration detection electrode. The electrode 42a is formed at the both edges of the rectangle in the longitudinal direction, to serve as the drive electrode for self diagnosis.

Further, a portion without electrodes is formed outside the electrodes 42a and 42b. The electrode 41b is formed in the vicinity of a central portion for supporting, to serve as the vibration detection electrode. The electrode 42b is formed at the both edges of the rectangle in the longitudinal direction, to serve as the drive electrode for self diagnosis. The electrodes 41a and 41b are connected to each other at an edge surface along the longer sides of the piezoelectric element 400, so are the electrodes 42a and 42b. In addition, the electrodes 43a and 43b are disposed approximately over the entire surface of the piezoelectric element except at connection portions with the electrodes 41 and 42, and connected to each other at the edge surface at the opposite longer side.

Moreover, since the portion without electrodes is formed outside the electrodes 42a and 42b, the resonance frequency which is determined by whole length of the piezoelectric element does not become extremely high to obtain preferable resonance frequency. Further the ratio of area of the self diagnosis electrode can be varied arbitrarily to increase a flexibility of design of the sensor.

Eleventh Preferred Embodiment

Figure 36:
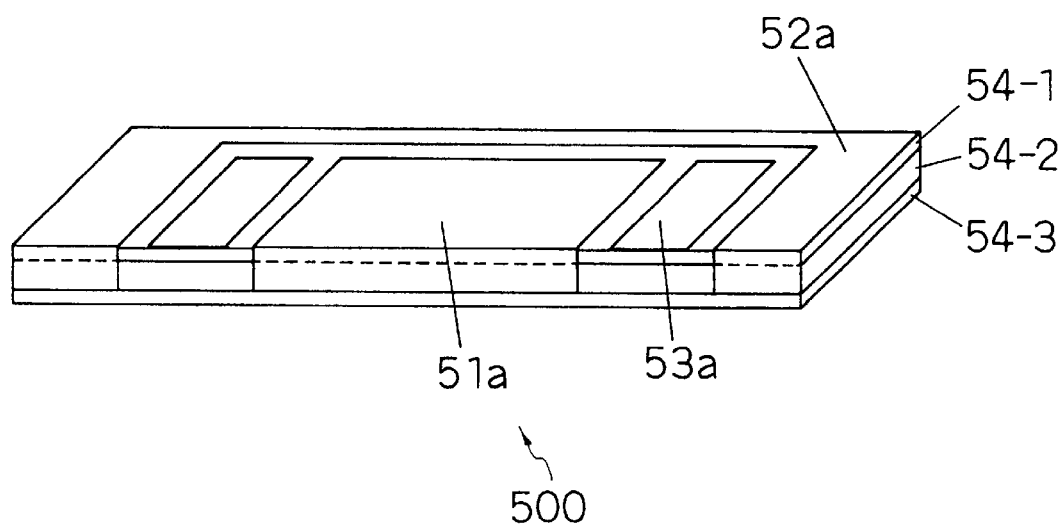
FIG. 36 is a view showing an outer appearance of a piezoelectric element which is used in an acceleration sensor according to an eleventh preferred embodiment of the present invention.
Figure 37:
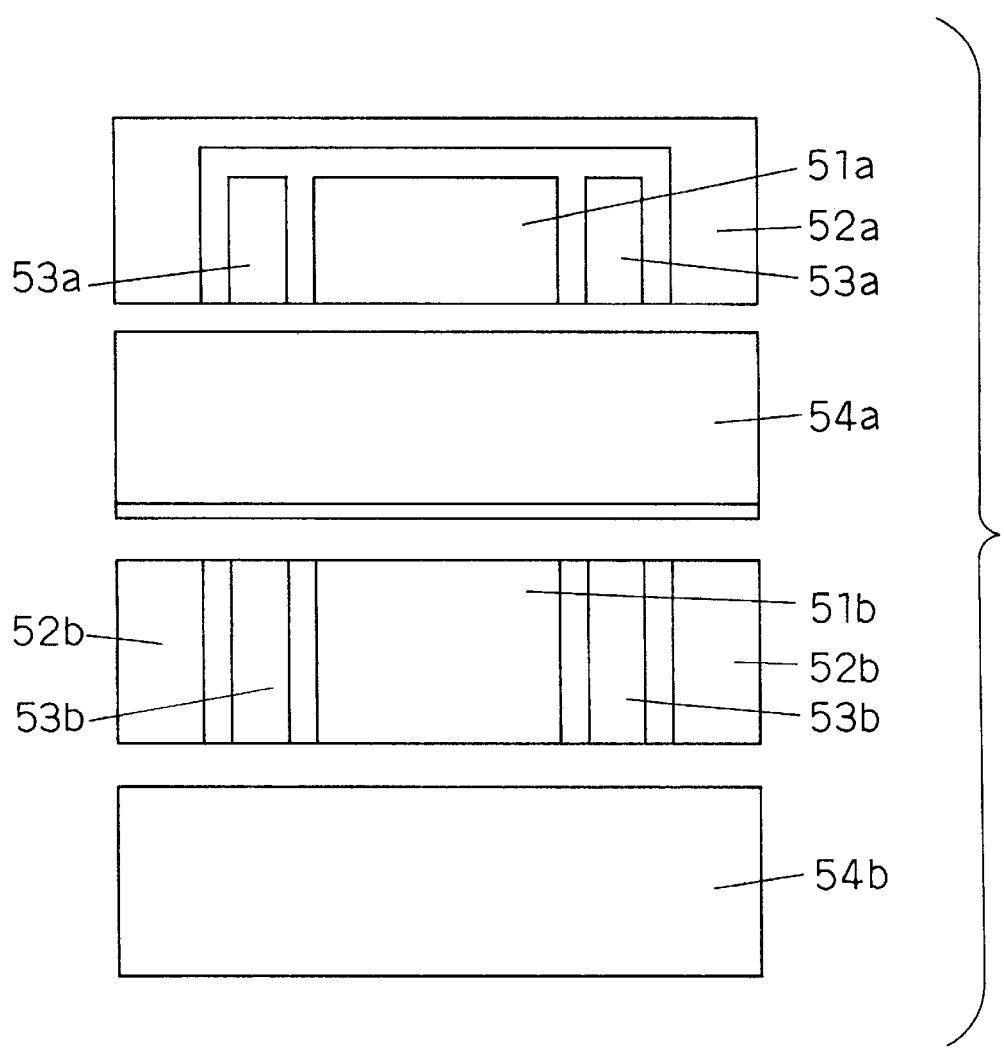
FIG. 37 is a plan view of electrodes of the piezoelectric element which is used in the acceleration sensor according to the eleventh preferred embodiment of the present invention.
Figure 38:
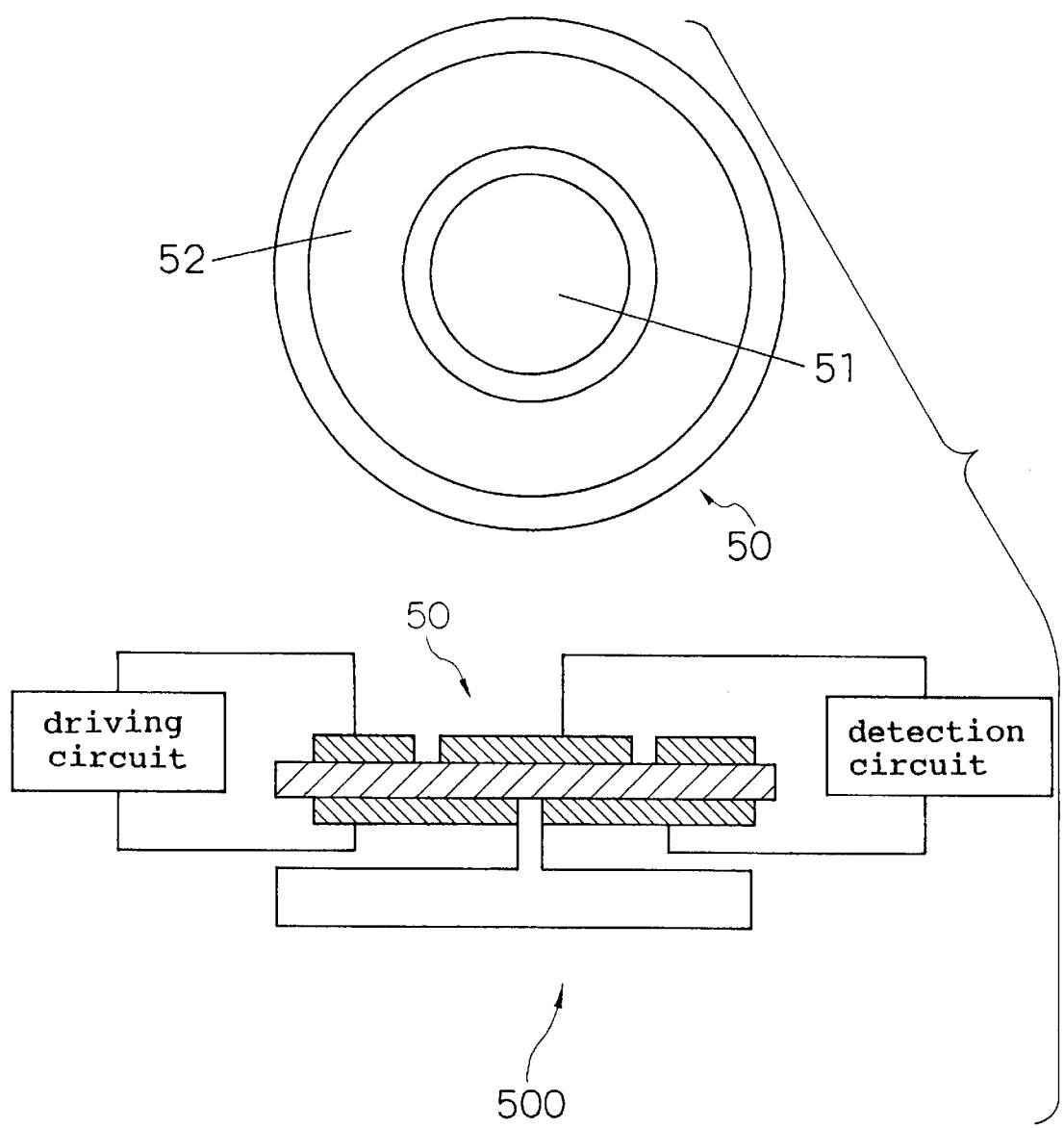
FIG. 38 is a plan view of electrodes of a piezoelectric element which is used in a conventional acceleration sensor.
Figure 39:
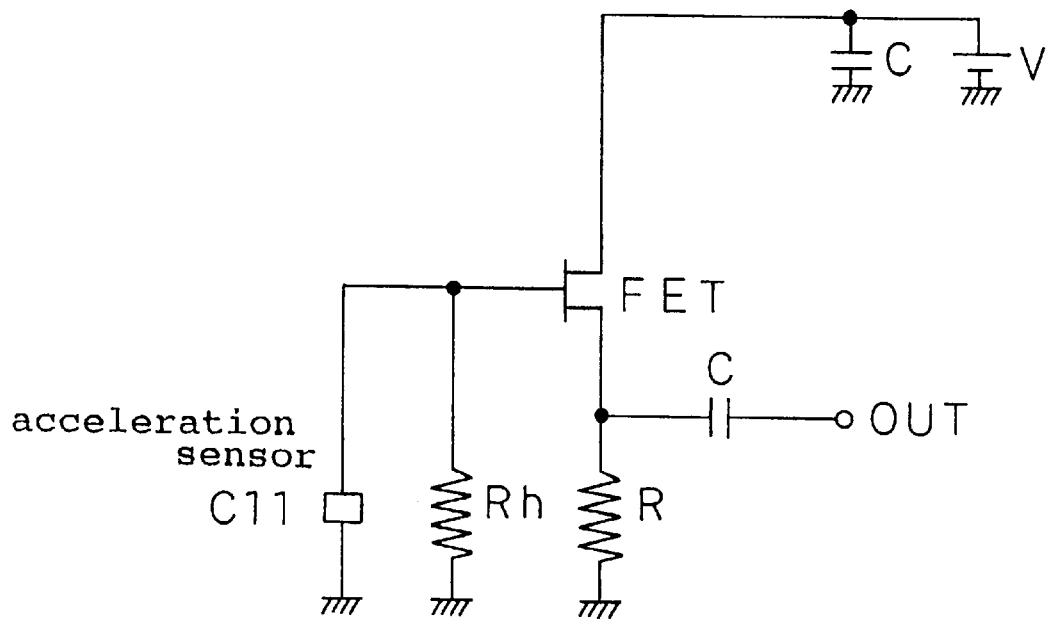
FIG. 39 is a view showing a signal processing circuit which is generally used in an acceleration sensor.

FIG. 36 is a view showing an outer appearance of a piezoelectric element of an acceleration sensor according to other preferred embodiment of the present invention, and FIG. 37 is a plan view of electrodes in respective layers of the piezoelectric element.

The piezoelectric element 500 has a structure of a rectangular shape which is formed by a stack of three layers 54-1, -2 and -3. The layers 54-1 and 54-2 are polarized in opposite directions to each other. Electrodes 51a and 52a are disposed in the top surface of the piezoelectric element 500, an electrode 54a is disposed between the layer 54-1 and the layer 54-2, electrodes 51b and 52b are disposed between the layer 54-2 and the layer 54-3, and an electrode 54b is disposed in the bottom surface. Two electrodes 51a and 52a are disposed in space from each other in the top surface of the layer 54-1. The electrode 51a is formed in the vicinity of a central portion for supporting, to serve as the vibration detection electrode. The electrode 52a is formed at the both edges of the rectangle in the longitudinal direction, to serve as the drive electrode for self diagnosis, and mutually connected by a connection portion which is formed in the vicinity of the center of the longer sides of the piezoelectric element.

An electrode (i.e., a dummy member) 53a is a member of a dummy which is not connected to either the vibration detection electrode or the self diagnosis electrode. The electrode 51b is formed in the vicinity of a central portion for supporting, to serve as the vibration detection electrode. The electrode 52b is formed at the both edges of the rectangle in the longitudinal direction, to serve as the drive electrode for self diagnosis. The electrode (i.e., a dummy member) 53b is a dummy electrode which is not connected to either the vibration detection electrode or the self diagnosis electrode. The electrodes 51a and 51b are connected to each other at an edge surface along the longer sides of the piezoelectric element 500, so are the electrodes 52a and 52b. Further, the electrodes 54a and 54b are disposed approximately over the entire surface of the piezoelectric element except at connection portions with the electrodes 51 and 52, and connected to each other at the edge surface at the opposite longer side.

Operations for detecting an acceleration upon application of the acceleration are similar to those shown in FIG. 6.

Self diagnosis is performed in a similar manner to that shown in FIG. 7, using the electrode 51 as the vibration detection electrode and the electrode 52 as the drive electrode.

Further, since the dummy electrode is formed, it is possible to prevent warping due to a difference in sintering-induced contraction which is created by depending on whether the electrodes are disposed or not in the piezoelectric element.

In all of the preferred embodiment described above, the respective piezoelectric member layers are not limited to layers which mainly contain lead zirconate titanate. Instead, the respective piezoelectric member layers may mainly contain lead titanate, lead zirconate, lanthanum lead, etc. In addition, the electrodes are not limited to silver. Instead, gold, chromium, nickel, copper or the like may be used as the electrodes, or such materials may be stacked to form the electrodes, or further alternatively, an alloy of such materials may be used as the electrodes. The material of the container is not limited to alumina, but may be metal, resin, etc. The external electrodes are not limited to silver solder, but may be a ref lowable material such as silver braze.

Figure 40:
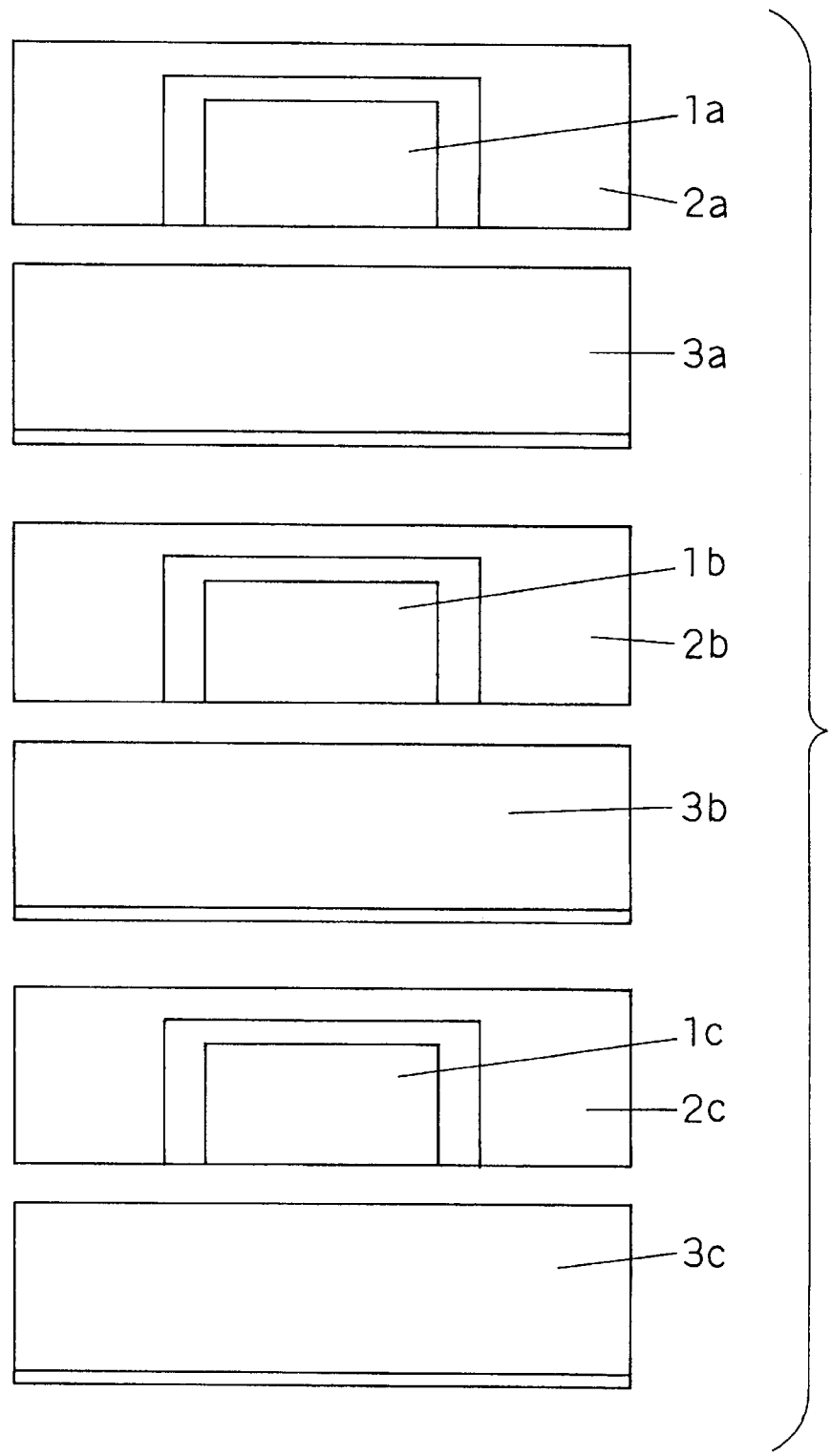
FIG. 40 is a plan view of disassembled electrodes of the piezoelectric element which is used in the acceleration sensor according to one preferred embodiment of the present invention.
Figure 41:
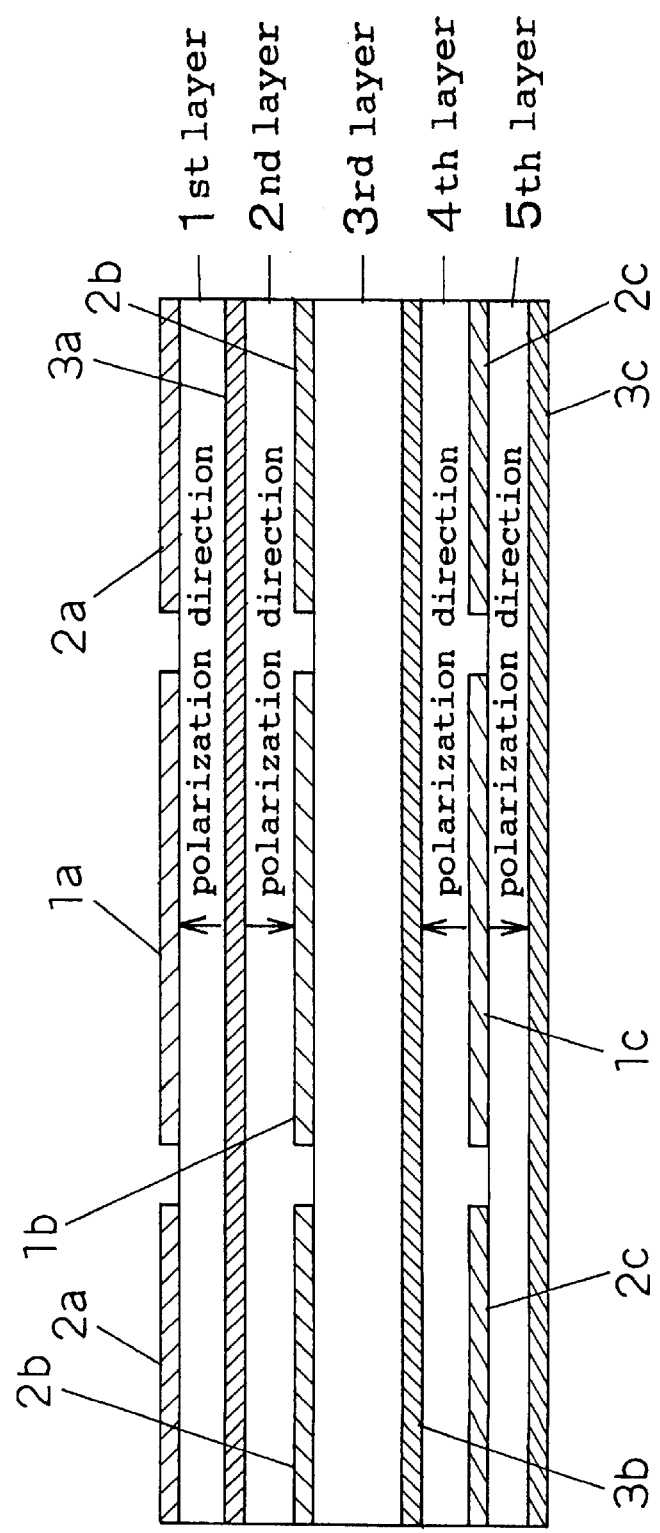
FIG. 41 is a sectional view showing the element of FIG. 40.
Figure 42:
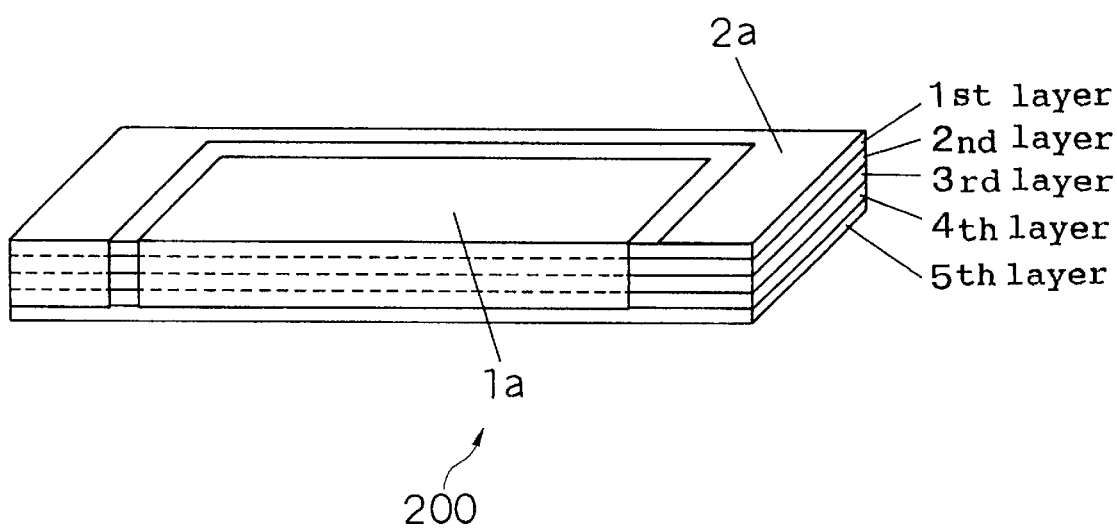
FIG. 42 is a view showing an outer appearance of the piezoelectric element of FIG. 40.

The number of the stacked layer is not limited to three. Where a larger number of layers are stacked, electrodes at every other layer may be connected at the edge surfaces. For example FIG. 40, FIG. 41 and FIG. 42 show the case of five stacked layer. Meanwhile FIG. 40 shows a plan view of disassembled electrodes of the piezoelectric element which is used in the acceleration sensor according to one preferred embodiment of the present invention and FIG. 41 is a sectional view showing the element of FIG. 40; and FIG. 42 is a view showing an outer appearance of the piezoelectric element of FIG. 40.

In all the above mentioned embodiments the detection means for acceleration can be any other method than the Impedance conversion method.

Thus, it is possible to realize a small-size acceleration sensor which has a high electrostatic capacitance, maintains a high sensitivity even at a low frequency and performs accurate self diagnosis in a low frequency range, without using means for electric connection such as wiring.

TABLE 1

| | width of the vibration detection electrode (mm) | length of the vibration detection electrode (mm) | surface area size (mm³) | | sensitivity (mV/G) of | |
|---|---|---|---|---|---|---|
| | | | vibration detection portion | self diagnosis portion | the vibration detection portion | capacitance × sensitivity (coulomb) |
| acceleration sensor according to a first preferred embodiment | 0.5 | 7.8 | 7.8 × 0.5 | 3.9 | 1.2 | 3.2 |
| acceleration sensor according to a sixth preferred embodiment | 1.0 | NO. 1  2.0<br>NO. 2  3.0<br>NO. 3  4.0<br>NO. 4  5.0<br>NO. 5  6.0 | 2.0<br>3.0<br>4.0<br>5.0<br>6.0 | 7.5<br>6.3<br>5.0<br>3.9<br>2.7 | 3.5<br>2.7<br>2.5<br>2.3<br>2.0 | 4.9<br>5.7<br>1.0<br>7.3<br>7.5 |

What is claimed is:

1. An acceleration sensor comprising:

a piezoelectric element formed in a rectangular shape and including a piezoelectric member layer having a plurality of stacked piezoelectric members, such that at least two of the stacked piezoelectric members are polarized, and a plurality of electrodes positioned such that at least one electrode is disposed on a first major opposed surface of said piezoelectric member layer, at least one electrode is disposed on each major opposed surface of each polarized piezoelectric member, and a vibration detection electrode and a drive electrode are disposed on at least a second major opposed surface of the piezoelectric member layer, the vibration detection electrode being positioned at a center of the second major opposed surface, and the drive electrode having two electrically connected parts, each part being located on or near a longitudinal edge of the second major opposed surface, and impedances formed by each polarized piezoelectric member with the at least one electrode disposed on each major surface thereof are electrically connected in parallel; and a support member for supporting the piezoelectric element, the support member supporting the piezoelectric element substantially at a center of a length of the piezoelectric member layer.

2. The acceleration sensor of claim 1, wherein said drive electrode is also disposed at or in the vicinity of the both edges of the other surface F of said piezoelectric member layer, and the parts of the drive electrode at or in the vicinity of both edges of said surface F are electrically connected to each other on said surface F as well.

3. The acceleration sensor of claim 1, wherein said drive electrode is also disposed at or in the vicinity of the both edges of the other surface F of said piezoelectric member layer, and the parts of the drive electrodes at or in the vicinity of both edges are not connected to each other on said surface F.

4. The acceleration sensor of claim 1, wherein a dummy member is disposed between said vibration detection electrode and said drive electrodes which are formed on the same surface of said piezoelectric member layer, and said dummy member is not connected to said vibration detection electrode and said drive electrodes.

5. The acceleration sensor of claim 1, wherein said vibration detection electrode and said drive electrode are connected through said support member to externally disposed electrodes.

* * * * *